United States Patent
Gildert

(10) Patent No.: US 10,500,730 B2
(45) Date of Patent: Dec. 10, 2019

(54) SYSTEMS, DEVICES, AND METHODS FOR SELF-PRESERVATION OF ROBOTIC APPARATUS

(71) Applicant: KINDRED SYSTEMS INC., Vancouver (CA)

(72) Inventor: Suzanne Gildert, Burnaby (CA)

(73) Assignee: Kindred Systems Inc., Vancouver (CA)

( * ) Notice: Subject to any disclaimer, the term of this patent is extended or adjusted under 35 U.S.C. 154(b) by 245 days.

(21) Appl. No.: 15/251,903

(22) Filed: Aug. 30, 2016

(65) Prior Publication Data

US 2017/0066128 A1    Mar. 9, 2017

Related U.S. Application Data

(60) Provisional application No. 62/214,667, filed on Sep. 4, 2015.

(51) Int. Cl.
  *G06F 19/00*    (2018.01)
  *B25J 9/16*    (2006.01)

(52) U.S. Cl.
  CPC ... *B25J 9/1679* (2013.01); *G05B 2219/31004* (2013.01); *G05B 2219/31387* (2013.01); *Y02P 90/285* (2015.11)

(58) Field of Classification Search
  CPC ....................................................... B25J 9/161
  See application file for complete search history.

(56) References Cited

U.S. PATENT DOCUMENTS

| | | | | |
|---|---|---|---|---|
| 9,050,723 | B1* | 6/2015 | Elazary | G06F 11/0793 |
| 2011/0178635 | A1* | 7/2011 | Anderson | E01H 10/007 700/253 |
| 2012/0099950 | A1* | 4/2012 | Jeong | G05B 19/4189 414/222.01 |
| 2014/0229008 | A1* | 8/2014 | Schnittman | A47L 9/106 700/259 |
| 2015/0185729 | A1* | 7/2015 | Kuffner, Jr. | B25J 9/0084 700/248 |
| 2015/0187436 | A1* | 7/2015 | Querbach | G06F 11/263 714/720 |
| 2015/0239436 | A1* | 8/2015 | Kanai | B60T 7/08 701/23 |
| 2015/0294741 | A1* | 10/2015 | Zhang | G11C 29/82 365/185.12 |
| 2016/0097699 | A1* | 4/2016 | Leao | G07C 3/00 702/34 |

(Continued)

*Primary Examiner* — Harry Y Oh
(74) *Attorney, Agent, or Firm* — Seed IP Law Group LLP

(57) ABSTRACT

Robotic apparatus employ a large variety of resources to operate. A robotic apparatus seeks out sources of energy, computational capacity, shelter, communications, and/or other resources to preserve or renew its energy stores, computational resources, or physical integrity and/or to receive further guidance or direction or to report collected or sensed data or information. A robotic apparatus can determine the existence of a resource deficiency or projected resource deficiency, assess a ranking of such, identify one or more remedial actions, and execute the remedial action(s). A robotic apparatus can assess a ranking of a resource deficiency or projected resource deficiency based on a value of the resource, a severity of need or urgency for the resource, and ability to obtain or replenish the source.

32 Claims, 17 Drawing Sheets

(56) References Cited

U.S. PATENT DOCUMENTS

2016/0144512 A1* 5/2016 Kim .................. H04N 13/271
 15/319
2017/0289277 A1* 10/2017 Lee .................. H04L 29/08

* cited by examiner

SYSTEMS, DEVICES, AND METHODS FOR SELF-PRESERVATION OF ROBOTIC APPARATUS

BACKGROUND

Technical Field

This disclosure generally relates to improving the performance of robotic apparatus including improving the longevity and/or capacity of the same.

Description of the Related Art

Robotic Apparatus

Robotic apparatus are systems, machines, or devices that are capable of carrying out one or more tasks. Robotic apparatus may be operated by an operator, such as, via remote control, or may operate autonomously without control of an operator. Hybrid robotic apparatus exist in which some functions are autonomous while others are operator controlled. Robotic apparatus require various types of resources to operate, such as energy resources, computational resources, communications resources, and tangible resources. Some of these resources are consumable (e.g., energy), and need to be refreshed from time-to-time. Other of these resources are not consumable (e.g., communications), yet need to be available on a continuous or non-continuous basis.

BRIEF SUMMARY

A system may be summarized as including a body; a sensor subsystem communicatively coupled to the body; at least one processor communicatively coupled to the sensor subsystem; and at least one non-transitory computer-readable storage media coupled to the at least one processor, and which stores processor-executable instructions thereon which when executed causes the at least one processor to: receive, from the sensor subsystem, information specifying a first plurality of resources, determine a plurality of resource deficiencies associated with a second plurality of resources from amongst the first plurality of resources, wherein the second plurality of resources is fewer than the first plurality of resources, create a ranking for the plurality of resource deficiencies, determine a remedial action for a resource deficiency in the plurality of resource deficiencies, and cause at least one component of the system to, at least, attempt to execute the remedial action.

When executed, the processor-executable instructions may further cause the at least one processor to detect one or more actual resource deficiencies.

When executed, the processor-executable instructions may further cause the at least one processor to assess one or more imminent resource deficiencies.

When executed, the processor-executable instructions may further cause the at least one processor to project future levels for the plurality of resources based on the information specifying the plurality of resources; and compare the future levels for the plurality of resources to a plurality of thresholds.

When executed, the processor-executable instructions may further cause the at least one processor to project future levels for the plurality of resources based on information specifying levels of the plurality of resources, and information specifying the rate of consumption of the plurality of resources.

When executed, the processor-executable instructions may further cause the at least one processor to project future levels for the plurality of resources based on a position of the body in a physical space.

When executed, the processor-executable instructions may further cause the at least one processor to determine that the plurality of resource deficiencies exists amongst the plurality of resources in conjunction with information describing a context of the robotic system.

When executed, the processor-executable instructions may further cause the at least one processor to determine an energy resource deficiency exists in the plurality of resource deficiencies.

When executed, processor-executable instructions may further cause the at least one processor to determine a communication resource deficiency exists in the plurality of resource deficiencies.

When executed, the processor-executable instructions may further cause the at least one processor to determine a computational resource deficiency in the plurality of resource deficiencies.

When executed, the processor-executable instructions may further cause the at least one processor to determine a safety resource deficiency exists in the plurality of resource deficiencies.

When executed, the processor-executable instructions may further cause the at least one processor to determine an enrichment resource deficiency exists in the plurality of resource deficiencies.

When executed, the processor-executable instructions may further cause the at least one processor to create the ranking for the plurality of resource deficiencies based on a predetermined ranking of resources.

When executed, the processor-executable instructions may further cause the at least one processor to create the ranking for the plurality of resource deficiencies based on the plurality of resource deficiencies associated with the second plurality of resources from amongst the first plurality of resources.

When executed, the processor-executable instructions may further cause the at least one processor to return information specifying the plurality of resource deficiencies and information specifying the ranking for the plurality of resource deficiencies.

A method of operation of a robotic apparatus may be summarized as including receiving, by at least one processor, information specifying a first plurality of resources for the robotic apparatus; determining, by the at least one processor, a plurality of resource deficiencies associated with a second plurality of resources from amongst the first plurality of resources, wherein the second plurality of resources is fewer than the first plurality of resources; selecting, by the at least one processor, a resource deficiency from the plurality of resource deficiencies; determining, by the at least one processor, a remedy to the resource deficiency; and causing, by the at least one processor, the robotic apparatus to implement the remedy to the resource deficiency. Determining the plurality of resource deficiencies associated with the second plurality of resources from amongst the first plurality of resources may include detecting, by the at least one processor, one or more actual resource deficiencies. Determining the plurality of resource deficiencies associated with the second plurality of resources from amongst the first plurality of resources may include assessing, by the at least one processor, one or more imminent resource deficiencies.

The method may further include projecting, by the at least one processor, future levels for the plurality of resources for the robotic apparatus based on the information specifying the plurality of resources for the robotic apparatus; and comparing, by the at least one processor, the future levels for the plurality of resources for the robotic apparatus to a plurality of thresholds.

The method may further include projecting, by the at least one processor, future levels for the plurality of resources for the robotic apparatus based on information specifying levels of the plurality of resources for the robotic apparatus, and information specifying the rate of consumption of the plurality of resources for the robotic apparatus.

The method may further include projecting, by the at least one processor, future levels for the plurality of resources for the robotic apparatus based on a position of the robotic apparatus in a physical space. Determining the plurality of resource deficiencies associated with the second plurality of resources from amongst the first plurality of resources may include determining, by the at least one processor, that the plurality of resource deficiencies exists amongst the plurality of resources in conjunction with information describing a context of the robotic apparatus. Determining the plurality of resource deficiencies associated with the second plurality of resources from amongst the first plurality of resources may include determining, by the at least one processor, an energy resource deficiency in the plurality of resource deficiencies. Determining the plurality of resource deficiencies associated with the second plurality of resources from amongst the first plurality of resources may include determining, by the at least one processor, a communication resource deficiency in the plurality of resource deficiencies. Determining the plurality of resource deficiencies associated with the second plurality of resources from amongst the first plurality of resources may include determining, by the at least one processor, a computational resource deficiency in the plurality of resource deficiencies. Determining the plurality of resource deficiencies associated with the second plurality of resources from amongst the first plurality of resources may include determining, by the at least one processor, a safety resource deficiency in the plurality of resource deficiencies. Determining the plurality of resource deficiencies associated with the second plurality of resources from amongst the first plurality of resources may include determining, by the at least one processor, an enrichment resource deficiency in the plurality of resource deficiencies.

Selecting the resource deficiency from the plurality of resource deficiencies may further include selecting, by the at least one processor, the resource deficiency from the plurality of resource deficiencies based on a predetermined ranking of resources.

Selecting the resource deficiency from the plurality of resource deficiencies may further include determining, by the at least one processor, a plurality of degrees of deficiency for the plurality of resource deficiencies associated with the second plurality of resources from amongst the first plurality of resources; and selecting, by the at least one processor, the resource deficiency from the plurality of resource deficiencies based on the plurality of degrees of deficiency for the plurality of resource deficiencies.

Determining the remedy to the resource deficiency may further include selecting from the group consisting of moving the robotic system in a physical space; doing nothing; and sending a distress signal.

A robotic apparatus may be summarized as including a body; at least one processor physically coupled to the body; at least one non-transitory computer-readable storage medium coupled to the at least one processor, and which stores processor-executable instructions which when executed causes the at least one processor to receive a request to remedy a deficiency in a resource for the robotic apparatus; determine at least one remedy to the resource deficiency; and return information specifying one or more remedies of the at least one remedy to the resource deficiency.

When executed, the processor-executable instructions may further cause the at least one processor to determine capacity of the robotic apparatus to act on one or more remedies of the at least remedy to the resource deficiency; and return information specifying capacity of the robotic apparatus to act on one or more remedies of the at least remedy to the resource deficiency.

When executed, the processor-executable instructions may further cause the at least one processor to determine a capacity of the robotic apparatus to act on one or more remedies of the at least remedy to the resource deficiency based on a factor selected from the group consisting of time, distance, energy budget, level of need, level of resource(s) required to replenish to act on one or more remedies of the at least remedy, level of danger, internal state of robotic apparatus, external conditions to robotic apparatus, and availability of replacement part(s).

When executed, the processor-executable instructions may further cause the at least one processor to cause the robotic apparatus to collect data related to the at least one remedy.

When executed, the processor-executable instructions may further cause the at least one processor to determine the at least one remedy to the resource deficiency based on the data related to the at least one remedy.

When executed, the processor-executable instructions may further cause the at least one processor to receive the request to remedy the deficiency in the resource for the robotic apparatus, further comprises receiving information that specifies a deficiency in an energy resource, a computational resource, a communication resource, a safety resource, or an enrichment resource.

The robotic apparatus may further include an operator interface, communicatively coupled to the processor; and, when executed, the processor-executable instructions may further cause the at least one processor to receive information created by an operator at the operator interface.

When executed, the processor-executable instructions may further cause the at least one processor to receive information that specifies a plurality of deficiencies in a plurality of resources for a robotic apparatus, wherein the plurality of deficiencies in the plurality of resources includes the deficiency in the resource for the robotic apparatus; determine at least two remedies to the plurality of deficiencies in the plurality of resources; and rank the at least two remedies.

When executed, the processor-executable instructions may further cause the at least processor to rank the at least two remedies by capacity of the robotic apparatus to act on the at least two remedies of the at least one remedy to the resource deficiency.

A method in a robotic system may be summarized as including receiving, at least one processor, a request to remedy a deficiency in a resource for the robotic system; determining, by the at least one processor, at least one remedy to the resource deficiency; selecting, by the at least one processor, a first remedy from the at least remedy to the resource deficiency; and causing, by the at least one processor, the robotic system to act on the first remedy.

The method may further include determining, by the at least one processor, a capacity of the robotic system to act on one or more remedies of the at least remedy to the resource deficiency. Determining, by the at least one processor, a capacity of the robotic system to act on one or more remedies of the at least remedy to the resource deficiency may include determining, by the at least one processor, the capacity of the robotic system to act on one or more remedies of the at least remedy to the resource deficiency based on a factor selected from the group consisting of time, distance, energy budget, level of need, level of resource(s) required to replenish to act on one or more remedies of the at least remedy, level of danger, internal state of robotic system, external conditions to robotic system, and availability of replacement part(s).

The method may further include causing the robotic system to collect data related to the at least one remedy.

The method may further include determining, by the at least one processor, the at least one remedy to the resource deficiency based on the data related to the at least one remedy.

Receiving, at the processor, the request to remedy the deficiency in the resource for the robotic system, may further include receiving information that specifies a deficiency in an energy resource, a computational resource, a communication resource, a safety resource, or an enrichment resource.

Receiving, at the processor, the request to remedy the deficiency in the resource for the robotic system, may further include receiving information created by an operator at an operator interface.

The method may further include receiving, at the at least one processor, information that specifies a plurality of deficiencies in a plurality of resources for a robotic system, wherein the plurality of deficiencies in the plurality of resources includes the deficiency in the resource for the robotic system; determining, by the at least one processor, at least two remedies to the plurality of deficiencies in the plurality of resources; and ranking, by the at least one processor, the at least two remedies. Ranking the at least two remedies may include ranking, by the at least one processor, the at least two remedies by capacity of the robotic system to act on the at least two remedies of the at least one remedy to the resource deficiency.

A method to replenish an on-board energy storage device of a robot, the robot comprising an arm, an end-effector coupled to the arm, the on-board energy storage device and a first part of a connector coupled to the on-board energy storage device, may be summarized as including securely releasably engaging a second part of the connector via the arm and the end-effector, the second part of the connector complementary to the first part of the connector; and manipulating, via the arm and the end-effector, the second part of the connector into secure, releasable, engagement with the first part of the connector to allow replenishment of the on-board energy storage device via the connector.

The method may further include after a suitable period, manipulating, via the arm and the end-effector coupled to the arm, the second part of the connector out of engagement with the first part of the connector.

The connector is an electrical connector, and may further include after a suitable period, manipulating, via the arm and the end-effector coupled to the arm, the second part of the electrical connector out of electrical contact with the first part of the electrical connector.

The method may further include manipulating, via the arm and the end-effector coupled to the arm, the second part of the connector into physical engaged contact with a docking station for the second part of the connector.

The connector is an electrical connector and may further include manipulating, via the arm and the end-effector coupled to the arm, the second part of the electrical connector into physical engaged contact with a docking station for the second part of the electrical connector.

The method may further include receiving a request to replenish the on-board energy storage device, and wherein securely releasably engaging a second part of the connector via the arm and the end-effector is responsive to receipt of the request to replenish the on-board energy storage device. Receiving a request to replenish the on-board energy storage device may include receiving, at the robot, information that specifics the request from an operator at an operator interface.

The method may further include determining that the on-board energy storage device is to be replenished, and wherein securely releasably engaging a second part of the connector via the arm and the end-effector is responsive to the determination to replenish the on-board energy storage device. The robot autonomously may determine that the on-board energy storage device is to be replenished.

Manipulating, via the arm and the end-effector coupled to the arm, a second part of the connector into secure, releasable, engagement with the first part of the connector, may further include receiving information that specifies a motion of the arm and the end-effector coupled to the arm from an operator at an operator interface.

Manipulating, via the arm and the end-effector coupled to the arm, a second part of the connector into secure, releasable, engagement with the first part of the connector, may further include autonomously generating information that specifies a motion of the arm and the end-effector coupled to the arm by the robot.

The second part of the connector may include a first electrode and a second electrode, and may be electrically coupled to a power source, and may further include testing a voltage across the first electrode and the second electrode in the second part of the connector to determine a sign of the voltage; and based on the sign of the voltage routing power from the power source to the on-board energy storage device, wherein the power has the correct polarity.

A robotic system may be summarized as including a body; an arm coupled to the body; an end-effector coupled to the arm; an on-board energy storage device coupled to the body; a first part of a connector coupled to the on-board energy storage device; at least one processor physically coupled to the body; at least one non-transitory computer-readable storage medium coupled to the processor, and which stores processor-executable instructions which when executed causes the at least one processor to: cause, the arm and the end-effector to securely releasably engage a second part of the connector via, the second part of the connector complementary to the first part of the connector; and cause the arm and the end-effector to manipulate the second part of the connector into secure, releasable, engagement with the first part of the connector to allow replenishment of the on-board energy storage device via the connector.

When executed, the processor-executable instructions may further cause the at least one processor to cause, after a suitable amount of time, the arm and the end-effector coupled to the arm to manipulate the second part of the connector out of engagement with the first part of the connector.

When executed, the processor-executable instructions may further cause the at least one processor to cause, after a suitable amount of time, the arm and the end-effector coupled to the arm to manipulate the second part of the electrical connector out of electrical contact with the first part of the electrical connector.

When executed, the processor-executable instructions may further cause the at least one processor to cause, after a suitable amount of time, the arm and the end-effector coupled to the arm to manipulate the second part of the connector into physical engaged contact with a docking station for the second part of the connector.

When executed, the processor-executable instructions may further cause the at least one processor to cause, after a suitable amount of time, the arm and the end-effector coupled to the arm to manipulate the second part of the electrical connector into physical engaged contact with a docking station for the second part of the electrical connector.

When executed, the processor-executable instructions may further cause the at least one processor to receive a request to replenish the on-board energy storage device, and wherein causing the arm and the end-effector coupled to securely releasably engage the second part of the connector via the arm and the end-effector is responsive to receipt of the request to replenish the on-board energy storage device.

When executed, the processor-executable instructions may further cause the at least one processor to receive information that specifics the request from an operator at an operator interface.

When executed, the processor-executable instructions may further cause the at least one processor to determine that the on-board energy storage device is to be replenished, and wherein causing the arm and the end-effector securely releasably engage a second part of the connector via is responsive to the determination to replenish the on-board energy storage device.

When executed, the processor-executable instructions may further cause the at least one processor to autonomously determine that the on-board energy storage device is to be replenished.

When executed, the processor-executable instructions may further cause the at least one processor to receive information that specifies a motion of the arm and the end-effector coupled to the arm from an operator at an operator interface.

When executed, the processor-executable instructions may further cause the at least one processor to autonomously generate information that specifies a motion of the arm and the end-effector coupled to the arm by the robot.

The second part of the connector may include a first electrode and a second electrode, and may be electrically coupled to a power source; and when executed, the processor-executable instructions may further cause the at least one processor to cause a voltage test across the first electrode and the second electrode in the second part of the connector to determine a sign of the voltage, and based on the sign of the voltage test, cause power from the power source to route the on-board energy storage device with the correct polarity.

An electrical connector may be summarized as including a first body, connected to a robotic apparatus, including: a first face on the first body; a first mechanical element on the first face on the first body; a first electrode on the first face on the first body and is connected to a first circuit coupled to a battery for the robotic apparatus; a second electrode on the first face on the first body and is connected to the first circuit coupled the battery for the robotic apparatus; a second body, electrically coupled to a power source, including: a second face on the second body; a second mechanical element on the second face on the second body, wherein the second mechanical element has a cooperative shape to the first mechanical element to allow the first face on the first body to mate with the second face on the second body; a third electrode on the second face on the second body and is connected to a second circuit coupled to the power source; and a fourth electrode on the second face on the second is connected to the second circuit coupled to the power source; and wherein: the second body is receivable by an end-effector of the robotic apparatus; the third electrode is arranged with respect to the first electrode such that when the first face mates with the second face the third electrode is in contact with the first electrode; and the fourth electrode is arranged with respect to the second electrode such that when the first face mates with the second face the fourth electrode is in contact with the second electrode. The first electrode on the first face on the first body may be a first plug; and the second electrode on the first face on the first body may be a second plug. The third electrode on the second face on the second body may be a first jack; and the fourth electrode on the second face on the second body may be a second jack. The first electrode, the second electrode, the third electrode, and the fourth electrode may be selected from the group consisting of a jack, and a plug, subject to the proviso that the first electrode is complementary to the third electrode, and the second electrode is complementary to the fourth electrode. The first mechanical element and the second mechanical element may be each selected from the group consisting of a depression and a protrusion, with the proviso the neither the first mechanical element and the second mechanical element are both a depression or both a protrusion. The first mechanical element may include a first surface that defines a frustum of an inverted cone. The second mechanical element may include a frustum of a cone. The second body may be manipulable by the end-effector of the robotic apparatus to mate the second face on the second body with the first face on the first body.

The electrical connector may further include a handle attached to the second body and extending outwardly from the second body parallel to the plane of the second face. The handle attached to the second body may be receivable by the end-effector of the robotic apparatus.

The electrical connector may further include a third face on the second body; and a third mechanical element on the third face on the second body. The second body may be manipulable by the end-effector of the robotic apparatus to mate the third face on the second body with a fourth face in a docking station.

The electrical connector may further include a first component in a first magnetic attachment system disposed within the first body to provide an attractive force in a first direction, wherein the first direction is suitably normal to the first face of the first body.

The electrical connector may further include a second component in the first magnetic attachment system disposed within the second body to further provide the attractive force in the first direction.

The electrical connector may further include a second magnetic attachment system disposed within the second body; and a third component in the second magnetic attachment system to provide an attractive force in a second direction suitably normal to the third face of the first body.

A connector to replenish a power source of a robot, the robot having a complementary connector and at least one end-effector may be summarized as including a first terminal; at least a second terminal, the second spaced from the first terminal; and a body, the body having at least one portion that is at least one of sized, dimensioned or shaped to be securely physically releasably engaged by the at least one end-effector of the robot, the body including at least one coupler that physically releasably couples to a complementary coupler of the complementary connector of the robot with the first terminal in communication with a first complementary terminal on the robot and the second terminal in communication with a second complementary terminal on the robot. The first terminal, the second terminal, the first complementary terminal, and the second complementary terminal may each be of a type selected from the group consisting of a jack, and a plug. The connector and the complementary connector may be keyed to physically releasably couple the connector to the complementary connector in an orientation.

The connector may further include a handle attached to the body. The handle attached to the body may be receivable by the end-effector of the robotic apparatus.

The connector may further include a component in a magnetic attachment system disposed within the body to provide an attractive force to physically couple the connector with the complementary connector.

The connector may include a complementary component in the first magnetic attachment system disposed within the complementary connector to further provide the attractive force to physically couple the connector with the complementary connector.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
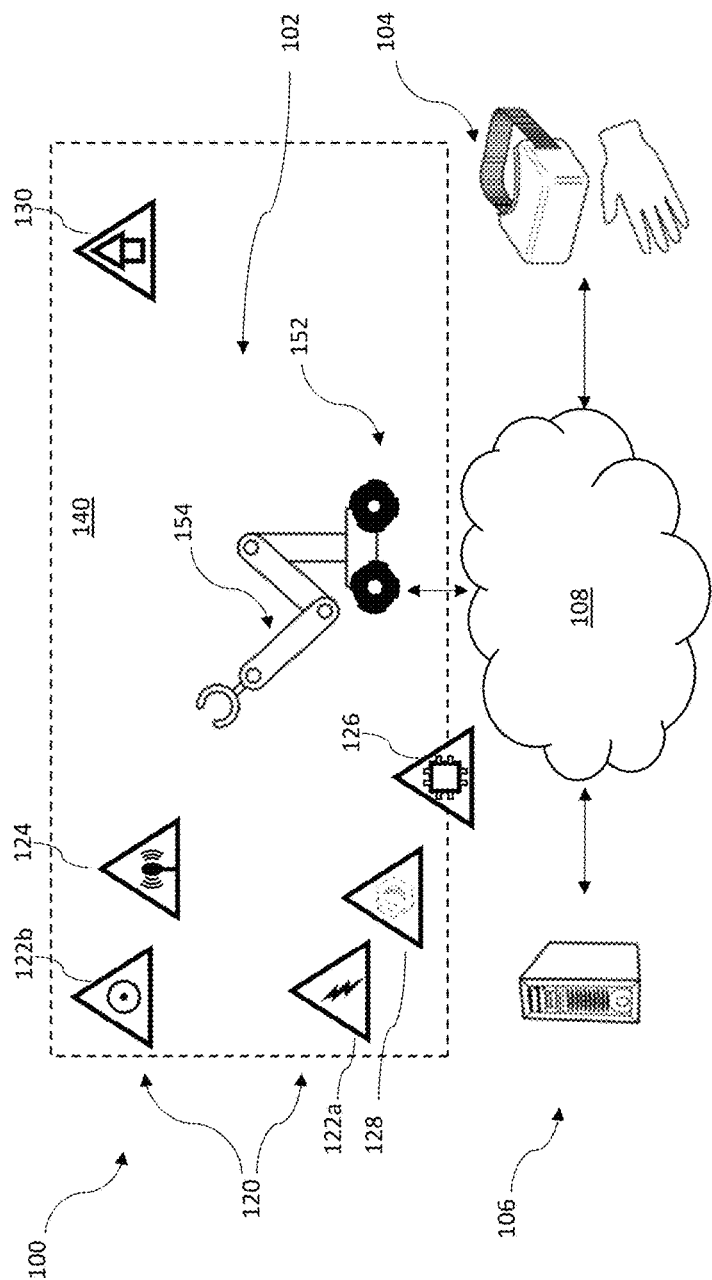
FIG. 1 is a schematic diagram illustrating a portion of a system including a robotic apparatus that may be used to implement the present systems, devices, articles, and methods.

In the following description, some specific details are included to provide a thorough understanding of various disclosed embodiments. One skilled in the relevant art, however, will recognize that embodiments may be practiced without one or more of these specific details, or with other methods, components, materials, etc. In some instances, well-known structures associated with robotics, such as processors, controllers, drive circuitry, motors, actuators, sensors, and wiring have not been shown or described in detail to avoid unnecessarily obscuring descriptions of the disclosed embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one", "an", or "another" applied to "embodiment", "example", or "implementation" means that a particular referent feature, structure, or characteristic described in connection with the embodiment, example, or implementation is included in at least one embodiment, example, or implementation. Thus, the appearances of the phrases "in one embodiment", or "in an embodiment", or "another embodiment" or the like in various places throughout this specification are not necessarily all referring to the same embodiment. Furthermore, the particular features, structures, or characteristics may be combined in any suitable manner in one or more embodiments, examples, or implementations.

It should be noted that, as used in this specification and the appended claims, the singular forms "a", "an", and "the" include plural referents unless the content clearly dictates otherwise. Thus, for example, reference to a problem-solving system including "an autonomous device" includes a single autonomous device, or two or more autonomous devices. It should also be noted that the term "or" is generally employed in its sense including "and/or" unless the content clearly dictates otherwise.

The headings provided herein are for convenience only and do not interpret the scope or meaning of the embodiments.

A robotic apparatus has need for resources such as energy, computational resources, physical integrity, source of enrichment, and communications with a remote system or user. The robotic apparatus can use these to enhance and prolong its existence. A robotic apparatus can be programmed to be intelligent. Thus a robotic apparatus can be programmed to detect actual or anticipated deficiencies (e.g., partial or complete) in resources, determine appropriate remedial actions (i.e., remedies), and act on the remedies. As described herein a robotic apparatus can rank various remedies according to various criteria, for instance based on situational awareness of a current state of the robotic apparatus and/or conditions in an environment in which the robotic apparatus is operating. A robotic apparatus can prioritize a plurality of deficiencies where each deficiency is associated with a respective resource.

There are a large variety of resources that are either necessary or desirable for a robotic apparatus to operate. The robotic apparatus could seek out sources of energy, computational capacity, shelter, communications, and/or other resources to preserve or renew its energy stores, computational resources, or physical integrity and/or to receive further guidance or direction or to report collected or sensed data or information. In some implementations, the robotic apparatus seeks out a power supply (e.g., electrical plug coupled to a power source) as a source of energy. In other implementations, the robotic apparatus seeks out light for solar power, or locations with inductive coupling charging structure. A robotic apparatus could seek out resources for maintaining its parts through repair or replacement. In some implementations, the robotic apparatus would to preserve or renew its computational resources by seeking a communication channel. For example, a wireless local area network (WI-FI™) or BLUETOOTH® communications channel. The robotic apparatus could seek greater computational processing capacity, storage, or the like, for instance offloading some computational tasks to a remote processor-based system or computer. In some implementations, physical integrity includes the integrity of the tangible robotic apparatus. As such, a robotic apparatus could seek shelter or environmental protection. In some implementations, these categories overlap. For example, a location in which power is available can also provide environmental protection or shelter for the robotic apparatus. As well, processor may be a computational resource or physical part that a robotic apparatus can install as a replacement or extra part.

FIG. 1 shows an exemplary robotic system in accordance with the present system, devices, articles, and method. As shown, the system 100 includes robotic apparatus 102, an operator interface 104, a computer system 106, and a collection of resources 120 distributed through a physical space 140. Other implementations can include robotic apparatus 102 but omit the operator interface 104. Examples of resources 120 include power (i.e., energy, e.g., electrical or inductive power supply 122a, sunlight or other source of light 122b, for photovoltaic array, hydrogen for a fuel cell array), communications resources such as WI-FI™ 124, proximate or remote computational resources 126, parts 128, and shelter 130. Robotic apparatus 102, the operator interface 104, and the computer system 106 may be in communication with one another. Sometimes, the robotic apparatus 102, the operator interface 104, and the computer system 106 are communicatively coupled via a network or non-network communication channel 108 such as a wire based network, wireless network, or combination of networks. In some implementations, robotic apparatus 102, operates without an operator interface 104 or operator. In some implementations, an operator at operator interface 104 pilots the robotic apparatus 102. In such implementations, robotic apparatus 102 can be denominated as a remotely operated vehicle. In some implementations, the apparatus 102 operates in communication with computer system 106 and possibly other computers (not show). Robotic apparatus 102 operates in an environment that comprises the physical space 140, the resources 120, and other objects. Computational resources 126 can be in physical space 140, outside of physical space 140, or both.

A robotic apparatus, like robotic apparatus 102, is an electro-mechanical machine controlled by circuitry and/or a processor following processor-executable instructions; an operator controllable electro-mechanical machine; a robotic subsystem of another machine including a robot; or the like. A robotic apparatus includes a robot. A robotic apparatus has the ability to move in a physical space, such as physical space 140, to accomplish physical tasks. As well, a robotic apparatus includes computational resources to preform computational tasks. The computational tasks can be in aid of the physical tasks.

A robotic apparatus includes a propulsion or motion subsystem 152 comprising of one or more motors, solenoids or other actuators, and associated hardware (e.g., drivetrain, wheel(s), treads), to propel the robotic apparatus in a physical space. The space does not need to be horizontal or terrestrial. Examples of spaces include water, air, vertical spaces, and the like.

A robotic apparatus includes a manipulation subsystem 154 comprising one or more appendages, such as, one or more arms and/or one or more associated end-effectors. An end-effector is a device attached to a robotic arm designed to interact with the environment. End-effectors for robotic apparatus operating in unstructured environments are devices of complex design. Ideally, these are capable of performing many tasks, including for example grasping or gripping or otherwise physically releasably engaging an object.

Figure 2:
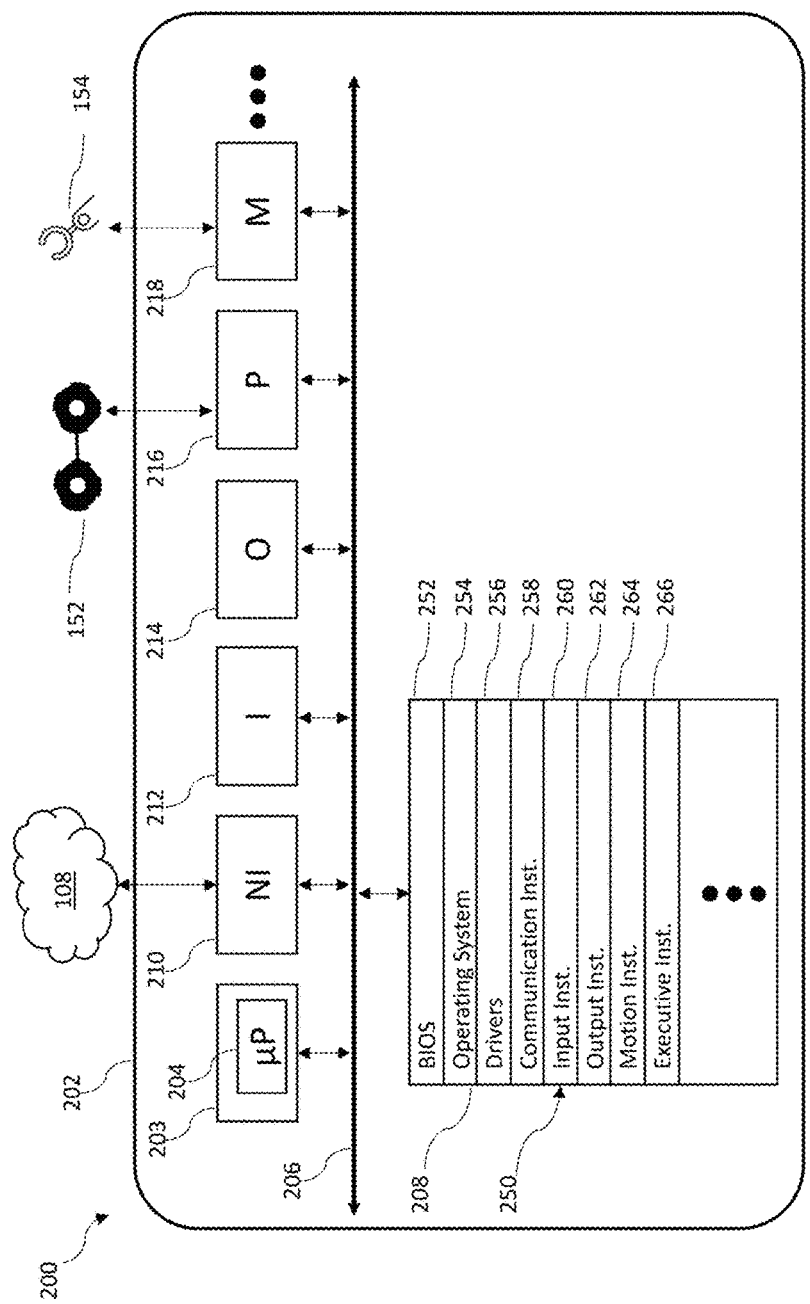
FIG. 2 is a schematic view illustrating an exemplary robotic apparatus suitable for inclusion in the system of FIG. 1.

FIG. 2 schematically shows parts of a robotic apparatus, including a processor for implementing aspects of the system 100 shown in FIG. 1 in accordance with the present system, devices, articles, and methods. Robotic apparatus 200 includes at least one body 202, and a control subsystem 203 that includes at least one processor 204, at least one nontransitory computer- or processor-readable storage device 208, and at least one bus 206 to which the at least one processor 204 and the at least one nontransitory computer- or processor-readable storage device 208 are communicatively coupled.

Robotic apparatus 200 includes a network interface subsystem 210 is communicatively coupled to bus(es) 206 and provides bi-directional communicative coupling to other systems (e.g., external systems external to the robotic apparatus) via network or non-network communications channel 108. Robotic apparatus 200 includes an input subsystem 212 comprising one or more sensors that detect, sensor, or measure conditions or states of the robotic apparatus and/or conditions in the environment in which the robotic apparatus operates, and produce or provide corresponding sensor data or information. Such sensors include cameras or other imagers, touch sensors, load cells, pressure sensors, microphones, meteorological sensors, chemical sensors or detectors, or the like. Robotic apparatus 200 includes an output subsystem 214 comprising output devices, such as, speakers, lights, and displays. Input subsystem 212 and output subsystem 214, are communicatively coupled to the processor(s) 204 via bus(es) 206. In some implementations, the input subsystem 212 includes receivers to receive position and/or orientation information. For example, global position system (GPS) data, two more time signals to for the control subsystem 203 to create a position measurement based data in the signals such as time of flight, signal strength, or other data to effect a position measurement.

Robotic apparatus 200 includes a propulsion or motion subsystem 216 comprising motors, actuators, drivetrain, wheels, and the like to propel or move the robotic apparatus 200 within a physical space and interact with it.

Robotic apparatus 200 includes a manipulation subsystem 218, for example comprising one or more arms, end-effectors, associated motors, solenoids, other actuators, linkages, drive-belts, and the like coupled and operable to cause the arm(s) and/or end-effector(s) to move within a range of motions. Manipulation subsystem 218 is communicatively coupled to the processor(s) 204 via bus(es) 206.

A person of ordinary skill in the art will appreciate the components in robotic apparatus 200 may be varied, combined, split, omitted, or the like. In some implementations one or more of the network interface subsystem 210, input subsystem 212, output subsystem 214, propulsion or motion subsystem 216 and/or manipulation subsystem 218 are combined. In some implementations, one or more of the subsystems (e.g., input subsystem 212) are split into further subsystems. In some implementations, the bus 206 is a plurality of buses (e.g., data buses, instruction buses, power buses) included in at least one body. For example, as part of a modular computing architecture where computational resources at distributed over the components of a robotic apparatus. In some implementations, the computational resources of a robotic apparatus can be located in the interstitial spaces between structural or mechanical components of robotic apparatus 200. That is, a robotic apparatus, like robotic apparatus 200, could in one embodiment have a processor in a left arm and a storage device in its thorax. A data storage device could be in a leg and a separate data storage device in another limb. In some implementations, the computational resources distributed over the body include redundant computational resources.

The at least one processor 204 may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUs), and the like. Processor 204 may be referred to in the singular, but may be two or more processors.

The network interface subsystem 210 may be any circuitry effecting bidirectional communication of processor readable data, and processor-executable instructions. Suitable communication protocols include FTP, HTTP, Web Services, SOAP with XML, and the like.

The at least one storage device 208 is at least one nontransitory or tangible storage device. In some implementations, storage device 208 includes two or more distinct devices. The storage device(s) 208 can, for example, include one or more a volatile storage devices, for instance random access memory (RAM), and one or more non-volatile storage devices, for instance read only memory (ROM), Flash memory, magnetic hard disk (HDD), optical disk, solid state disk (SSD), and the like. A person of skill in the art will appreciate storage may be implemented in a variety of ways such as a read only memory (ROM), random access memory (RAM), a hard disk drive (HDD), a network drive, flash memory, digital versatile disk (DVD), any other forms of computer-readable memory or storage medium, and/or a combination thereof. Storage can be read only or read-write as needed. Further, modern computer systems and techniques conflate volatile storage and non-volatile storage, for example, caching, solid-state hard drives, in-memory data processing, and the like. The at least one storage device 208 may store on or within the included storage media processor-readable data, and/or processor-executable instructions.

Storage device(s) 208 includes or stores processor-executable instructions and/or processor-readable data 250 associated with the operation of robotic apparatus 200.

The execution of the processor-executable instructions and/or data cause the at least one processor 204 to carry out various methods and actions, for example via the propulsion or motion subsystem 216 and/or manipulation subsystem 218. The processor(s) 204 can cause a robotic apparatus, such as robotic apparatus 200, to carry out various methods and actions. Processor-executable instructions and/or processor-readable data 250 can, for example, include a basic input/output system (BIOS) 252, an operating system 254, drivers 256, communication instructions and data 258, input instructions and data 260, output instructions and data 262, motion instructions and data 264, and executive instructions and data 266.

An exemplary operating system 254 is LINUX and ANDROID. The drivers 256 include processor-executable instructions and data that allow the processor(s) 204 to control circuitry of the robotic apparatus 200. Processor-executable communication instructions and data 258 include processor-executable instructions and data to implement communications between the robotic apparatus 200 and an operator console or terminal, a computer, or the like. Processor-executable input instructions or data 260 guide the robotic apparatus 200 in processing input from sensors in input subsystem 212. Processor-executable output instructions or data 262 guide the robotic apparatus 200 in interacting within the environment via components of the manipulation subsystem 218 or output subsystem 214. Processor-executable motion instructions and data 264 guide the robotic apparatus 200 in moving within its environment via components in propulsion or motion subsystem 216.

Processor-executable executive instructions and data 266 guide the robotic apparatus 200 in reasoning, problem solving, planning tasks, performing tasks, and the like. The processor-executable executive instructions and data 266 implement, in part, the methods described herein, including those in and in relation to FIGS. 4, 6-10, and 13-18.

Input subsystem 212 comprises sensors or transducers that acquire data for the robotic apparatus. The data include sensor information. Sensor information includes environmental sensor information representative of environmental conditions external to the robotic apparatus. Sensor information includes robotic conditions or state sensor information representative of conditions or states of the robotic apparatus including the various subsystems and components thereof. Such sensors may include one or more of cameras or imagers (e.g., responsive in visible and/or nonvisible ranges of the electromagnetic spectrum including for instance infrared and ultraviolet), radars, sonars, touch sensors, pressure sensors, load cells, microphones, meteorological sensors, chemical sensors, or the like. Sensor information can, for example, include diagnostic sensor information that is useful in diagnosing a condition or state of the robotic apparatus 200 or environment in which the robotic apparatus 200 operates. Such sensors may, for example, include contact sensors, force sensors, strain gages, vibration sensors, position sensors, attitude sensors, accelerometers, and the like. In some implementations, the diagnostic sensors include sensors to monitor a condition and/or health of an on-board power source (e.g., battery array, ultra-capacitor array, fuel cell array, fuel level). These sensors include voltmeter, ammeters, and associated conductive material and electrical loads.

Output subsystem 214 comprises one or more output devices. The output subsystem 214 allows robotic apparatus 200 to send signals into the robotic apparatus's environment. Example output devices are speakers, displays, lights, and the like. Robotic apparatus 200 may communicate with an agent, such as, a person, a robot, or another robotic apparatus.

Figure 3:
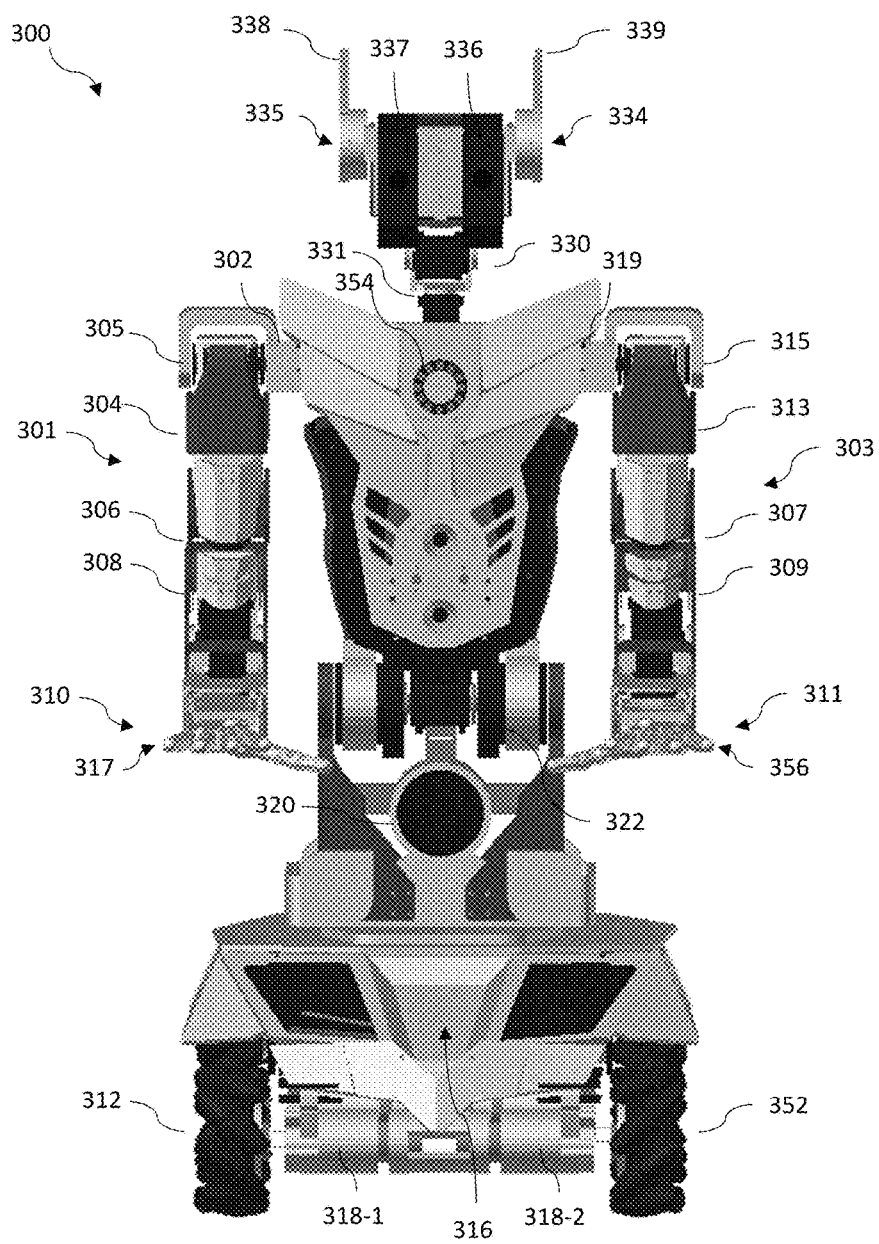
FIG. 3 is an elevation view illustrating a robotic apparatus in accordance with the present systems, devices, articles, and methods.

FIG. 3 illustrates an exemplary robotic apparatus 300. As discussed herein, robotic apparatuses may take any of a wide variety of forms. These include operator controllable robotic apparatus, autonomous robotic apparatus, and hybrid robotic apparatus. A robotic apparatus comprises one or more bodies, also called structural components, or brackets. The bodies are coupled by joints, for example, bearings and/or servo-motors. For example, a first body is connected to a second body by a servo or the like. It is possible to describe a robotic apparatus in terms of the joints or the bodies. FIG. 3 is described in terms of the joints but a person of skill in the art will appreciate a body based description is possible.

In various implementations, the shoulder servos 302 and 305 may control and sense roll and pitch respectively of a shoulder of a first arm 301 of the robotic apparatus 300. Roll is a motion analogous to adduction (i.e., toward the body) and abduction (i.e., away the body). Pitch is a motion analogous to flexion (i.e., curl or forearm moving forward) and extension (i.e., forearm moving backwards). In some implementations, the shoulder servos 302 and 305 may, for example be DYNAMIXEL™ MX-28, MX-64, or AX-12 servo-motors available from ROBOTIS INC. having place of business in Irvine, Calif., USA.

In some implementations, the shoulder yaw servo 304 may control and sense the yaw of the first arm 301 of the robotic apparatus 300. In various embodiments, the shoulder yaw servo 304 may be a servo-motor like shoulder servos 302 and 305. Yaw is a motion analogous to medial rotation (i.e., inward rotation toward the body) and lateral rotation (i.e., outward rotation away from the body).

In some implementations, the elbow servo 306 may control and sense an elbow of the first arm 301 of robotic apparatus 300. In various embodiments, the elbow servo 306 may be a servo-motor like shoulder servos 302 and 305.

In some implementations, the wrist servo 308 may control and sense an end-effector rotation of the robotic apparatus 300. In some implementations, the wrist servo 308 maybe a servo-motor as described herein and including servos for shoulder servos 302 and 305.

In various implementations, the end-effector 310 may include a plurality of digits 317. For example, four fingers and a thumb are shown in FIG. 3. A thumb generally is regarded as a digit that may be used to oppose two more digits. In some implementations, the digits of the end-effector 310 may include embedded force sensitive resistors. Respective servos, which may, for example be DYNAMIXEL™ XL-320 servo-motors or TOWERPRO™ hobby servos, may operate each digit independently. The end-effectors may, in some implementations, facilitate dexterous manipulation of objects.

In some implementations, one or more digits of digits 317 of the end-effector 310 may have polymer filled internal and external structure and/or rubber pads proximate to the extremities of the one or more digits of digits 317. The material may, in operation enhance grip capacity of an end-effector and simulate the resistance of a human finger.

In some implementations, digits, such as digits 317, may each have one or more contact sensors and/or pressure sensors to sense pressure applied to the sensor and produce signals proportional to the pressure.

The second arm 303 is generally similar to the first arm 301 but mirrored. Referring to FIG. 3, the second arm 303 includes a shoulder roll servo 319, a shoulder pitch servo 315, a shoulder yaw servo 313, an elbow servo 307, a wrist servo 309, and end-effector 311 including a plurality of digits 356.

In at least one implementation, the robotic apparatus 300 includes one or more components including wheels, such as wheel 312 and wheel 352, an electronics compartment 316, DC motors 318-1 and 318-2, a speaker 320, a waist pitch servo(s) 322, an interlock 326 (to share torso support with waist pitch servo(s) 322), a single board computer (SBC) (not shown), two neck servos including a head pitch servo 330 and a head yaw servo 331, ear servos 334 and 335, cameras 336 and 337, microphones 338 and 339, lights/LEDs 354 and cable bundles (not shown).

In some implementations, wheel 312 and wheel 352 provide the capacity for locomotion to the robotic apparatus 300. Wheel 312 and wheel 352 may provide a broad base which, in some examples, increases stability of the robotic apparatus 300. In other implementations, one or more treads can provide locomotion.

In various implementations for example, one or more on-board power sources may be found in the compartment 316. The on-board power sources can, for example include one or more batteries, ultra-capacitors, fuel cells, to independently power different components of the robotic apparatus 300. Servos can be on divided up over different batteries.

Exemplary batteries include secondary cells, for instance lithium polymer cells, for example, a 16V, 10000 mAh, four cell, LiPo battery; a 4000 mAh 3 cell 12 V battery; a 5 V 9600 mAh, USB mobile charging power pack; and a batter pack including one or more 3.7 V lithium ion batteries. Power busses of lower voltage can be down regulated from a higher voltage source.

Figure 4:
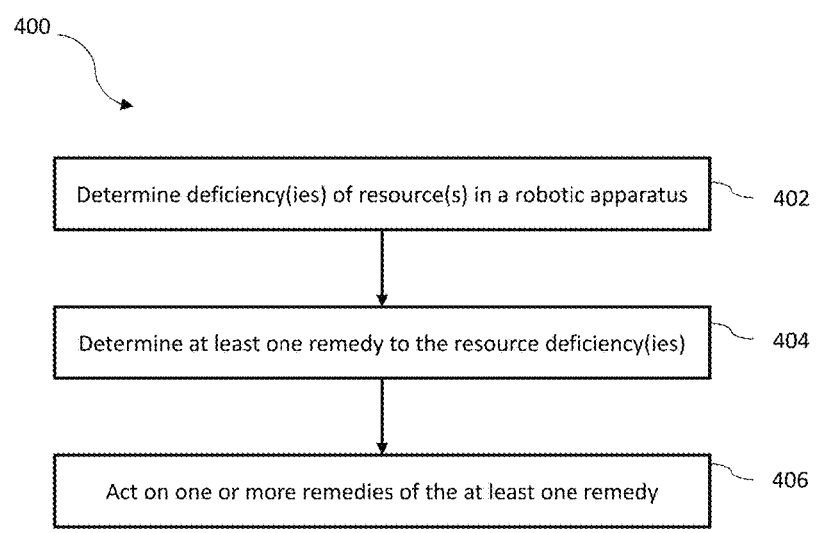
FIG. 4 is a flow-diagram of an implementation of a method of operation of a robotic apparatus to perform self-preservation and capacity enhancement in accordance with the present systems, devices, articles, and methods.

FIG. 4 shows a self-preservation method 400 that implements techniques for self-preserving a robotic apparatus. Those of skill in the art will appreciate that other acts may be included, removed, and/or varied to accommodate alternative implementations. Method 400 is described as being performed by a robot controller, for example, control subsystem 203 or processor(s) 204 in conjunction with other components of robotic apparatus 200 of FIG. 2. However, method 400 may be performed by another agent. For example, method 400 can be performed by in part by an on-board control subsystem (i.e., on board the robotic apparatus) 203 in conjunction or cooperation with an off-board control system (i.e., external or distinctly physically separate from the robotic apparatus).

Method 400 begins by an invocation by the robot controller. At 402, the robot controller detects, based on information from at least one sensor, a resource deficiency in a subject robotic apparatus. That is, the robot controller receives information from at least one sensor and detects, determines, or assesses a resource deficiency. Resources and associated resource deficiencies are described herein. The sensing of the resource deficiency can be accomplished with a real time monitor, an event driven monitor, scheduled polling of subsystems, and the like. In some examples of method 400, one or more deficiencies may co-exist. As discussed herein a robot controller can process two or more resource deficiencies and act on one or more according to factors like predetermined ranking and degree of deficiency.

Deficiencies may include a lack of a resource or a projected lack of resource, for instance a projected lack of a resource, which may or may not be imminent. In some implementations, the robot control projects one or more levels for one more resources and makes one or more projections for the one or more resources. Based on the one or more projections, and additional information, the robot controller can project one or more resource deficiencies. The additional information can include information specifying one or more of internal state or condition of the robotic apparatus, external conditions to the robotic apparatus, level(s) of resource(s), rate(s) of consumption of resource(s), availability of replacement(s), distance(s) to replacement(s), time(s) to replacement(s), and predetermined ranking(s) of resource(s) and associated degree of deficiency of resource(s).

At 404 robot controller determines at least one remedy to the resource deficiency, or deficiencies as the case may be. The robot controller in determining one or more remedies a resource deficiency may perform several acts. The robot controller may determine the capacity of the subject robotic apparatus to act on the at least one remedy.

At 406 robot controller causes the subject robotic apparatus to act on one or more remedies to the resource deficiency. That is, act on one or more of the at least one remedy to the resource deficiency. For example, the robot controller could cause the subject robotic apparatus, via a motion subsystem, to move in a physical space, and via manipulation subsystem 218 manipulate, and engage with a power supply (e.g., power source and coupled connector).

In some implementations, act 406 is replaced with a return act. The robot controller returns information specifying one or more of the at least one remedy to the resource deficiency.

Method 400 ends until invoked again. Alternative illustrations of method 400 are possible. Act 402 can be shown as being iteratively performed with branching logic that invokes acts 404 and 406 as needed.

Figure 5:
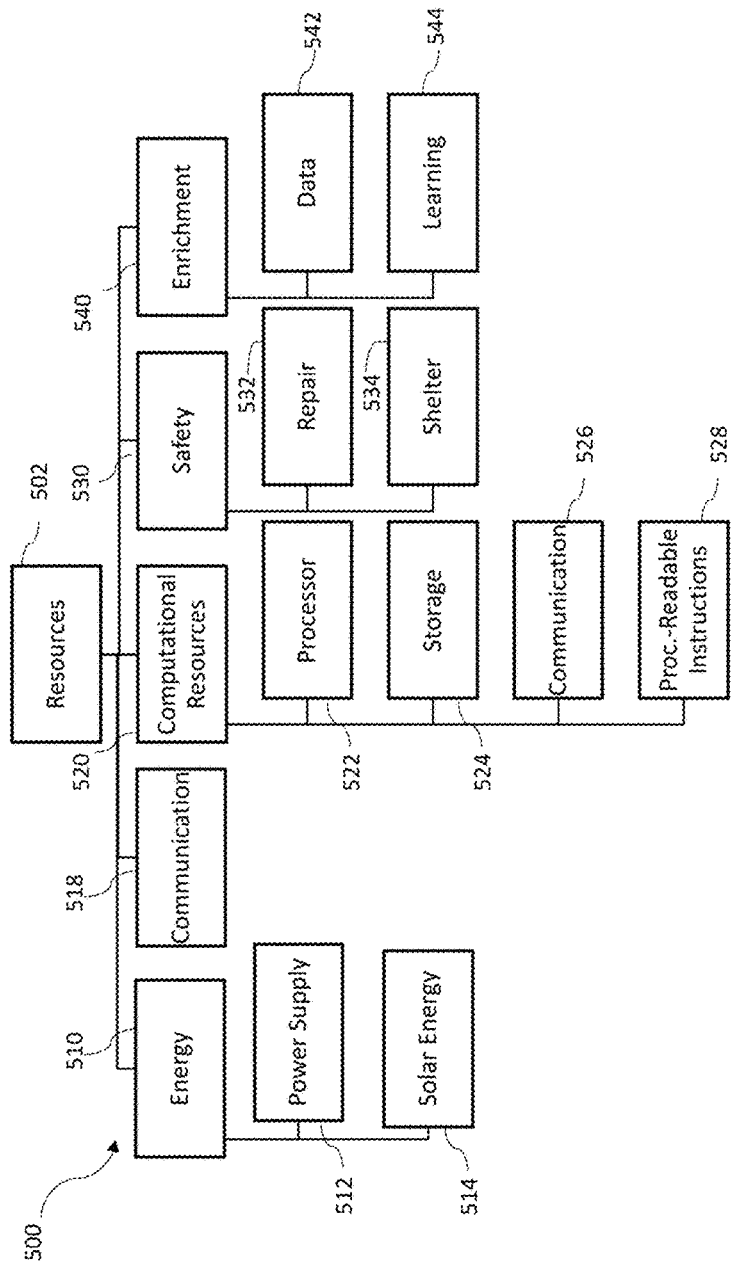
FIG. 5 is a schematic view illustrating a hierarchy of resources in accordance with the present systems, devices, articles, and methods.

FIG. 5 illustrates hierarchy of resources 500. Hierarchy of resources 500 is anchored by root node 502 representing all resources. Some examples of hierarchy 500 include two or more branches. Hierarchy 500 has four branches. In some implementations, the order of the branches and the positions of then nodes within the branch dictate a precedence of the resources.

An exemplary branch is energy resources branch 510. Exemplary resources in the energy resources branch 510 are power supplies 512. Examples of power supplies are an electrical connector attached to power source, inductive power transfer apparatus (e.g., an inductor or inductive charging pad) attached to a power source, and the like. Another exemplary energy resource is solar energy 514. If the subject robotic apparatus includes one or more photovoltaic arrays, the robotic apparatus may renew its energy resources by seeking sun light, or other light, of intensity and composition suitable for charging a battery. Yet another exemplary power source is a supply of hydrogen, which can produce electrical power via a fuel cell array.

Some implementations include a communications resources branch 518. A subject robotic apparatus may require increased communications resources. Examples of communication channels include local area networks, wide area networks, Ethernet, WI-FI™, BLUETOOTH™, and the like. Nodes on the communications resources branch 518 could include: upload capacity, down load capacity, secured communication, alternative frequencies, signal strength (e.g., RSS) and the like (not shown).

Some implementations include a computational resources branch 520 in hierarchy 500. Examples of computation resources include processor capacity 522, storage capacity 524, and communication capacity 526 such as communication channel(s). For example, a robot controller in a subject robotic apparatus may cause the robotic apparatus to seek out increased processor capacity to aid in the subject robotic apparatus's function. As well, the subject robotic apparatus may need a larger capacity data store. Examples of communication channels include local area networks, wide area networks, Ethernet, WI-FI™, BLUETOOTH™, and the like. In some implementations, communication capacity 526 co-exists with the separate communication resources branch 518 in the hierarchy of resources 500. In some implementations, computational resources branch 520 includes processor-readable instructions 528. A robot controller can cause the subject robotic apparatus to seek out processor capacity 522, storage capacity 524, communication capacity 526, and/or processor-executable instructions.

Some implementations include a safety branch 530 in hierarchy 500. Examples of resources related to safety include repair resources 532. Repair resource 532, include sources of parts and tools to recondition, or replace parts and/or repair the operation of parts. Sources of parts include stores and capacity to manufacture one or more parts for the subject robotic apparatus. Another example of safety resources is shelter 534. A robotic apparatus can seek shelter if its environmental conditions change.

Some implementations include an enrichment resources branch 540 in hierarchy 500. Examples of resources related to enrichment include data 542. A robotic apparatus can acquire data 542 for machine learning purposes in real time or offline. Examples of enrichment resources include learning resources 544. A robotic apparatus can acquire data 542 and engage in learning through for example a training process, such as, supervised training, and/or validation of training.

Figure 6:
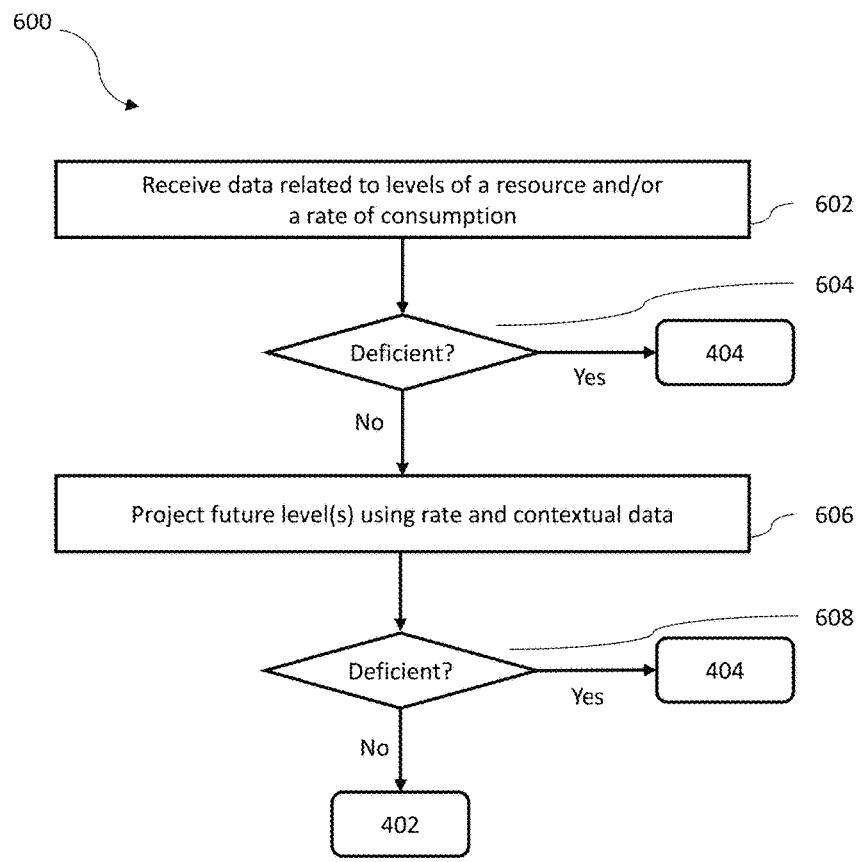
FIG. 6 is a flow-diagram of an implementation of a method of operation of a robotic apparatus to determine if a resource deficiency exists, or will exist, for the robotic apparatus in accordance with the present systems, devices, articles, and methods.

FIG. 6 illustrates a resource deficiency determination method 600 that implements techniques to determine if a resource deficiency exists. The method 600 can be executed as part of detecting or assessing a resource deficiency (act 402) of method 400 (FIG. 4). Those of skill in the art will appreciate that other acts may be included, removed, and/or varied to accommodate alternative implementations. Method 600 is described as being performed by a robot controller, for example, control subsystem 203 or processor(s) 204, potentiality in conjunction with other components robotic apparatus 200 of FIG. 2. However, method 600 may be performed by another agent. For example, method 600 can be performed by in part by an on-board control subsystem (i.e., on board the robotic apparatus) 203 in conjunction or cooperation with an off-board control system (i.e., external or distinctly physically separate from the robotic apparatus).

Method 600 begins by an invocation by the robot controller. At 602, the robot controller receives data related to level of a resource. The robot controller, in some implementations, receives a rate of consumption of the resource.

At 604, the robot controller compares the level of the resource to a threshold to determine if a resource deficiency exists. That is, detect an actual deficiency. If a deficiency exists (i.e., 604-Yes), control passes to 404 of method 400. If a deficiency does not exist (i.e., 604-No), control passes to 606.

In some implementations of method 600, the processing ends after act 604. In some implementations of method 600, the processing begins at 606. That is, if a projection method is accurate enough, resource deficiencies would be caught before occurrences of the resource deficiencies.

Some examples of method 600 include a projection of resources or resource deficiency. At 606, the robot controller projects future level(s) of one or more resources based on data, e.g., rate and current context. For example, based on the current rate of consumption and given the present amount of the resource. In some implementations, the robot controller creates a series of one or more projected resource levels each associated with a time. The robot controller may create a prediction based in part on data received from one or more sensors. At 608, the robot controller compares these projections.

In some embodiments, the robot controller projects a resource deficiency based on the context of a robotic apparatus. For example, the demand on a resource is relevant to the determination of a deficiency. Another example of context is density of resources in the environment. In some implementations, the context includes information specifying one or more of: internal state or condition of the robotic apparatus, external conditions to the robotic apparatus, level(s) of resource(s), rate(s) of consumption of resource(s), availability of replacement(s), distance(s) to replacement(s), time(s) to replacement(s), and predetermined ranking(s) of resource(s) and associated degree of deficiency of resource(s).

At 608, the robot controller compares one or more projected levels of a resource to a threshold level for the resource to determine if a deficiency will exist. That is determine or assess if an imminent deficiency will occur. If a deficiency will exist (i.e., 608-Yes), control passes to 404 of method 400. If no deficiency would exist (i.e., 604-No), control passes to 402 of method 400.

Method 600 ends until invoked again.

Figure 7:
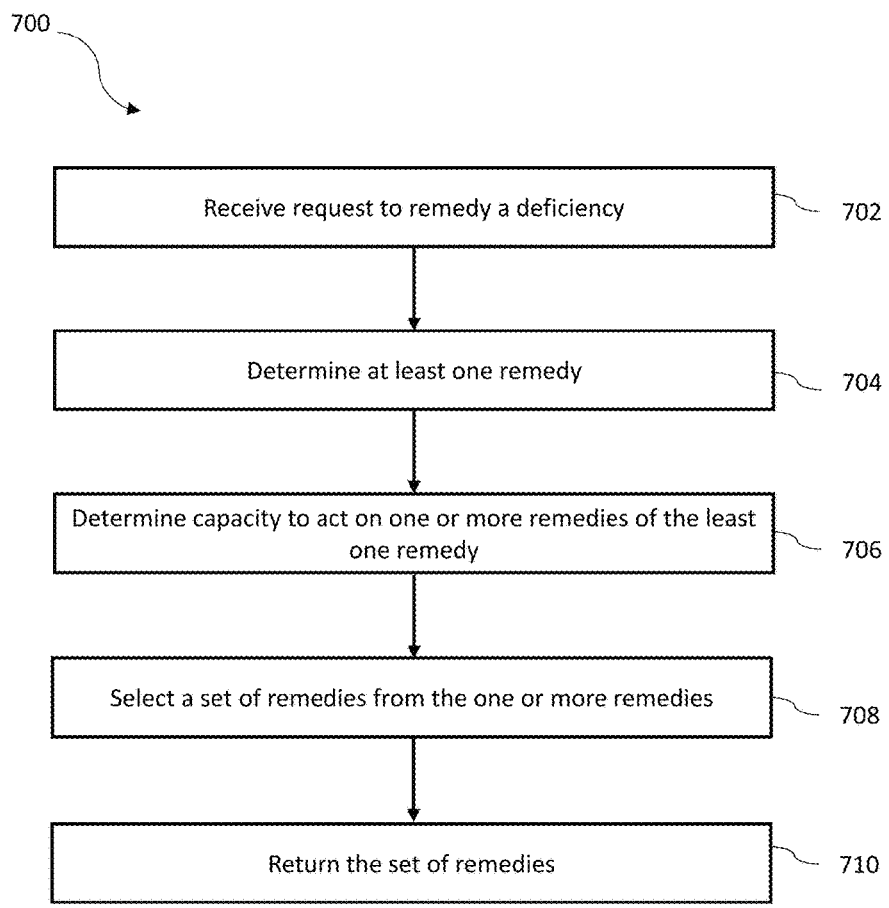
FIG. 7 is a flow-diagram of an implementation of a method of operation of a robotic apparatus to determine one or more remedies to a resource deficiency for the robotic apparatus in accordance with the present systems, devices, articles, and methods.

FIG. 7 illustrates a resource deficiency determination method 700 that implements techniques to determine one or more remedies to one or more resource deficiencies. The method 700 can be executed as part of determination of at least one remedy, such as, 404 of method 400 (FIG. 4). Those of skill in the art will appreciate that other acts may be included, removed, and/or varied to accommodate alternative implementations. Method 700 is described as being performed by a robot controller, for example, processor 204, potentiality in conjunction with other components robotic apparatus 200 of FIG. 2. However, method 700 may be performed by another agent. For example, method 700 can be performed by in part by an on-board control subsystem (i.e., on board the robotic apparatus) 203 in conjunction or cooperation with an off-board control system (i.e., external or distinctly physically separate from the robotic apparatus).

At 702, the robot controller receives a request to determine a remedy to a resource deficiency. At 704, the robot controller determines at least one remedy to the resource deficiency. Example remedies include renewing or replenishing a resource, moving location to renew or replenish a resource or improve communications, moving an appendage (e.g., arm, end-effector) to renew or replenish a resource, sending a distress signal, reducing need for a resource, doing nothing, and the like.

At 706 the robot controller determines a capacity of the robotic apparatus to act on the one or more remedies of the at least one remedy to the resource deficiency. The number of the one or more remedies maybe equal to or less than the number of the at least one remedy. The remedies may be evaluated by factors such as time, distance, energy budget, level of need, level of resource(s) required to replenish, level of danger, internal state of robotic apparatus, external conditions to robotic apparatus, and availability of replacement part(s). In some implementations, the robot controller ranks the remedies. The ranking of remedies can be first by resource, thus enforcing, a hierarchy of resources, and then for remedies with a resource, a ranking by capacity. In some implementations, the robot controller ranks the remedies by a predefined ranking of resources associated with the deficiencies. In some implementations, the robot controller ranks the remedies based on a predefined degree of resource deficiencies associated with the resources. For example, a resource may have low importance but have high a degree of resource deficiency.

At 708, the robot controller selects a (sub-)set of remedies from the one or more remedies. In some implementations, the robot controller selects the (sub-)set of remedies based the ranking in act 706. In some implementations, the robot controller selects the (sub-)set of remedies based on capacity. In some implementations, the robot controller selects a subset of the one or more remedies. In some implementations, the robot controller selects all of the one or more remedies. In some implementations, the robot controller selects a (sub-)set of remedies based on a predefined ranking of resources associated with the deficiencies. In some implementations, the robot controller selects a (sub-)set of remedies based on a predefined degree of resource deficiencies associated with the resources.

At 710, the robot controller returns the (sub-)set of remedies from the one or more remedies. In some implementations, information is returned that specifies the sub-set of remedies and a ranking of the same. The robotic apparatus can then take appropriate remedial action, for example, at 406 of method 400 (FIG. 4) based at least in part on the sub-set of remedies.

Method 700 ends until invoked again. In some implementations of method 700, more than one resource deficiency are addressed in method 700.

Figure 8:
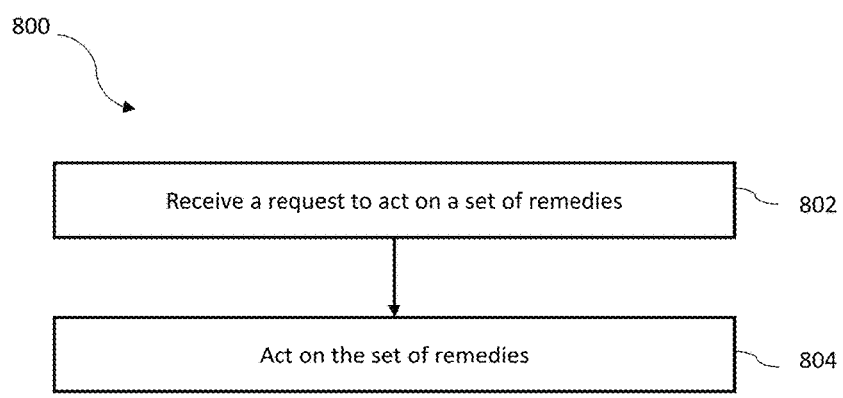
FIG. 8 is a flow-diagram of an implementation of a method of operation of a robotic apparatus to execute one or more remedies to a resource deficiency for the robotic apparatus in accordance with the present systems, devices, articles, and methods.

FIG. 8 illustrates a remedial action method 800 to act on or carry out one or more remedies to a resource deficiency. The method 800 can be executed as part of execution of a remedial action 406 of method 400 (FIG. 4). Those of skill in the art will appreciate that other acts may be included, removed, and/or varied to accommodate alternative implementations. Method 800 is described as being performed by a robot controller, for example, processor 204, potentiality in conjunction with other components robotic apparatus 200 of FIG. 2. However, method 800 may be performed by another agent. For example, method 600 can be performed by in part by an on-board control subsystem (i.e., on board the robotic apparatus) 203 in conjunction or cooperation with an off-board control system (i.e., external or distinctly physically separate from the robotic apparatus).

At 802, the robot controller receives a request to act on a set of remedies to at least one resource deficiency. For example, a subject robotic apparatus may require or desire greater computational resources. The robot controller generates or receives (e.g., receive from an external or off-board device) information specifying a set of remedies to at least one resource deficiency and information specifying a request to act on the same. At 804, the robot controller acts on the set of remedies to at least one resource deficiency. The robot controller may draw up on processor-executable instructions in the processor-executable executive instructions 266 to implement the set of remedies to at least one resource deficiency. The robot controller acts on the set of remedies in an order until termination. For example, exhaustion of time, or replenishment of the resource that is deficient.

Method 800 ends until invoked again.

Figure 9:
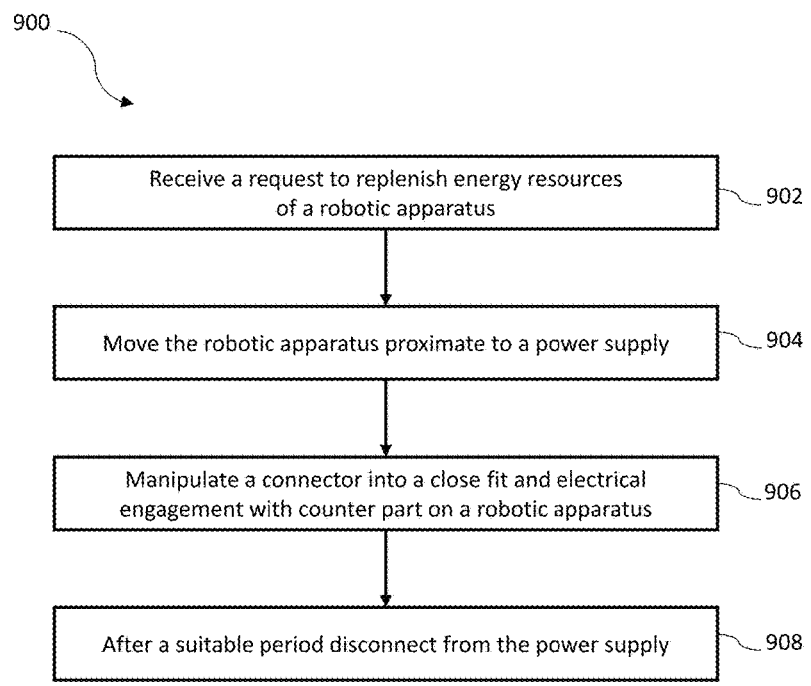
FIG. 9 is a flow-diagram of an implementation of a method of operation in a robotic apparatus that connects to a power supply in accordance with the present systems, devices, articles, and methods.

FIG. 9 illustrates a method 900 that implements techniques to direct a robotic apparatus to connect to an off-board source of power, e.g., power supply. Those of skill in the art will appreciate that variation to the description of preceding methods apply to method 900.

At 902, the robot controller receives a request to replenish the energy resources of a subject robotic apparatus. For example, the request may come from an operator interface from where an operator is piloting a semi-autonomous robotic apparatus. In some implementations, the request comes from an operator interface to a robotic apparatus piloted by the operator at the operator interface. In some implementations, the robotic apparatus autonomously generates the request.

At 904, the robot controller causes the subject robotic apparatus to move closer to a power source external to the robot, e.g., off-board power supply. The robot controller may draw up on processor-executable instructions in the processor-executable executive instructions 266 to cause the robotic apparatus to navigate to the power source. The robot controller causes the subject robotic apparatus to move via a motion subsystem.

In some implementations, the robot controller determines one or more paths for the subject robotic apparatus to reach the off-board power source, e.g., power supply, at a known location. In some implementations, the robot controller can determine the location of the power supply via position sensors and position data. In some implementations, the robot controller has access to data that records the location, or relative location, of one or more power supplies. The robotic controller can develop and/or update a map, table, or other data structure that lists various available power supplies. The robot controller can develop and/or update the map, table, or other data structure as the robotic apparatus moves throughout an environment, for instance performing various other tasks. Also for example, the robot controller can check the map, table, or other data structure to determine one or more paths for the subject robotic apparatus to reach one or more power supply.

In some implementations, the robot controller determines a plurality motions for the subject robotic apparatus to discover power supply at an unknown location. In some implementations, the robot controller creates a series of random motions for the robot to move about a physical space. In some implementations, the robot controller creates a series non-random motions for the subject robotic apparatus. For example, a power supply will not be randomly located in a room but would likely be against a wall. In some implementations, the series non-random motions will be informed by current context and historical data.

At 906, the robot controller causes the subject robotic apparatus to manipulate the power source connector with end-effectors on the subject robotic apparatus. The robot controller causes the subject robotic apparatus to operate an appendage (e.g., arm or end-effector) to grasp or grip or otherwise engage (e.g., magnetically) and manipulate a first part of an electrical connector into a close fit engagement and an electrical engagement with a second part of the electrical connector. The first part of the electrical connector is a component in an incomplete circuit in the power supply. That is, the robotic apparatus connects to the power supply.

At 908, after a suitable period the robot controller causes the subject robotic apparatus to manipulate the power supply (e.g., power source connector, electrical connector) with one or more end-effectors on the subject robotic apparatus. The robot controller disconnects from the power supply. Using internal sensors such as a clock and/or a voltmeter the robot controller can determine a suitable amount of time. A suitable period for many robotic apparatus is a full charge. Current battery technology requires between 2 to 8 hours to charge a battery for a system like shown in FIG. 3. Another suitable period is enough time to receive enough of a charge to meet a predetermined energy budget. Using position-integral-derivative (PID) control the robot controller can forecast when a suitable period will end and plan ahead. Method 900 ends until invoked again.

In an alternative to method 900 at act 906, the robot controller causes the subject robotic apparatus to manipulate at least one body included in the subject robotic apparatus into connection with the power supply without using end-effectors on the subject robotic apparatus. For example, the robotic apparatus uses its propulsion or motion subsystem to guide the at least one body including a first part of the electrical connector into a close fit engagement and an electrical engagement with a second part of the electrical connector. Here the second part of the electrical connector is associated with the power supply. Alternatively, the robotic apparatus uses its propulsion or motion subsystem to guide the at least one body position and inductor therein in proximate position and inductive coupling with an inductive recharger located in the environment (e.g., located in a house or shelter for the robotic apparatus).

Figure 10:
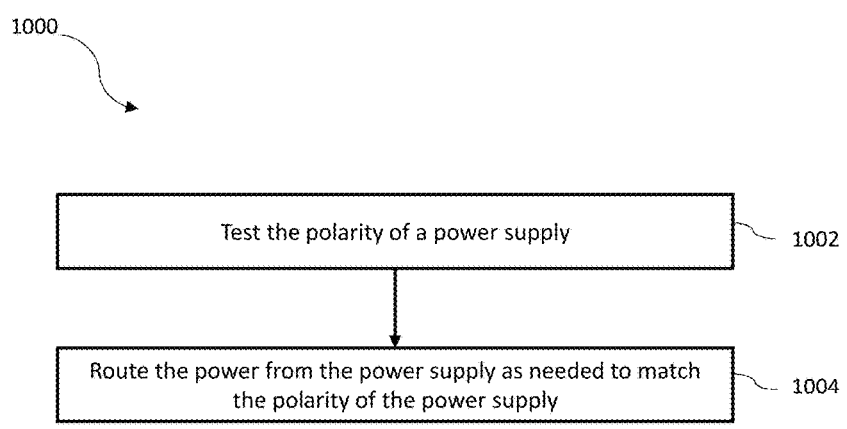
FIG. 10 is a flow-diagram of an optional set of acts for the method of FIG. 9, in accordance with the present systems, devices, articles, and methods.

FIG. 10 illustrates a method 1000 that implements techniques to direct a robotic apparatus to connect to a power supply. Those of skill in the art will appreciate that variation to the description of preceding methods apply to method 1000.

Method 1000 begins by an invocation by a robot controller. In some implementations, method 1000 starts after manipulation of the power source connector in act 906 of method 900 (FIG. 9). As previously noted, the method 900 can be employed in executing a remedial action 406 (FIG. 4), and thus method 1000 can be incorporated into performance of the remedial action 406.

At 1002, the robot controller tests the polarity of a power supply, for example via at least one internal sensor. A power supply can have polarized power but the tines, contacts, terminals, or sockets on an associated electrical connector can lack any indication of this. Thus, by testing the voltage of the power supply the controller can learn the polarity of the power supply, and thus learn if the power supply is properly connected or is reversed.

At 1004, the robot controller causes the robotic apparatus to (re)route the power from the power supply as needed to match the polarity. For example, using a relay the robotic apparatus routes the current as needed.

Method 1000 continues at act 908 of method 900, or the equivalent.

An electrical connector is an electro-mechanical device for joining electrical circuits using a mechanical assembly with at least two configurations engaged and disengaged. In the engaged configuration electrodes, or terminals, in the first part are in a close fit engagement and electrical contact with electrodes in the second part of the electrical connector. In the disengaged configuration the opposite is true. That is, an electrical connector is a selectively detachable component.

Figure 11:
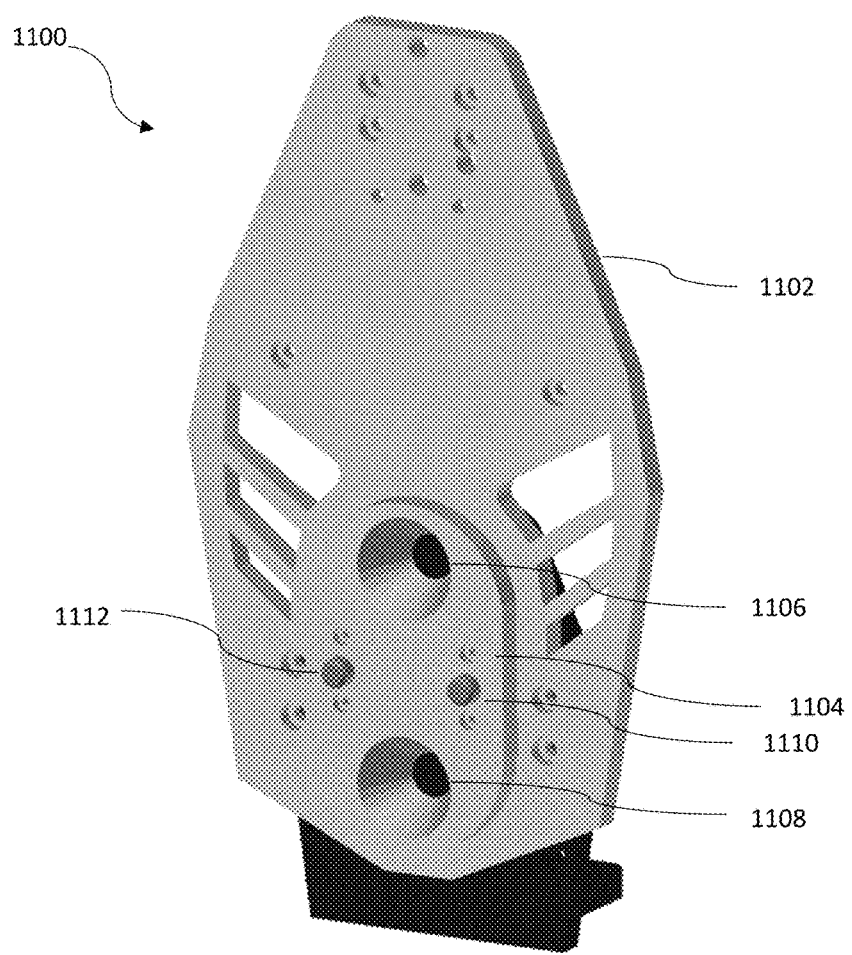
FIG. 11 illustrates, in an axonometric view, a first part of an electrical connector in accordance with the present systems, devices, articles, and methods.

FIG. 11 illustrates a first part of an electrical connector 1100. The first part 1100 of the electrical connector comprises a body 1102, a face 1104 on body 1102, and disposed on, and/or defined by, face 1104 is at least one mechanical element. The mechanical element may be a depression, a protrusion, and the like. In some implementations, a pair of depressions are included in body 1102. The pair of depressions includes a first depression 1106 and a second depression 1108. Also included in body 1102 is a first void for including a first electrode 1110, and a second void for including a second electrode 1112. An electrode can be included in a void (e.g., first or second void) via interference fit.

Typically, the electrical and mechanical elements of one or more connectors of the power supply or source are complementary in size, shape and configuration to corresponding electrical and mechanical elements of one or more connectors of the robotic apparatus to matingly detachably physically couple therewith and provide electrical communication therebetween. In some implementations, the mechanical coupling can be via a bayonet mount or less preferably via a screw mount. In other implementations, the mechanical coupling can be via a magnetic mount, where at least one connector includes at least one magnet of a first polarity or magnetic orientation, and the other connector includes a ferrous material or at least one magnetic of an opposite polarity or opposite magnetic orientation. The magnetic orientation can be arranged to ensure that the connectors are correctly oriented with respect to an electrical polarity of a supply voltage.

While generally described in terms of an electrical connection, other implementations can employ inductive charging. While an inductive recharger can be fixed in the environment (e.g., pad on floor, inductor in wall), in some implementations the inductive recharger can include a connector to allow the robotic apparatus to manipulate via its appendage(s) the inductive recharger connector of a power supply into close (inductively coupled) position with a recharging inductor that is part of, and moves with, the robotic apparatus.

Body 1102 is affixed to, and facing out from, a part of a robotic apparatus. For example, in FIG. 3, the robotic apparatus 300 includes a body like body 1102 in the abdomen area. In some implementations, body 1102 is include in the sternum of a robotic apparatus. However, a robotic apparatus need not have a humanoid shape. Body 1102 may be affixed to any part of a robotic apparatus that is accessible. Body 1102 is facing out when the first depression 1106 and the second depression 1108 are open to the environment.

In some implementations, first depression 1106 and second depression 1108 are inverted frustoconical shapes. Each of the first depression 1106 and the second depression 1108 could be an inverted cone, an inverted frustum of a cone, an inverted pyramid, an inverted frustum of a pyramid, an inverted cylinder, inverted right circular cylinder, and the like. The at least one depression on body 1102 is used to align corresponding electrodes to first electrode 1110, and second electrode 1112.

The depressions, first depression 1106 and second depression 1108, may be keyed to differentiate one from another. That is, the electrical connector is keyed. Some mechanical elements are used to prevent a first part mating with a second part except when the first and second part are correctly oriented.

First electrode 1110, and second electrode 1112 are part of an interrupted electrical circuit that includes at least one internal power source, such as, a battery. In some implementations, the first electrode 1110 and the second electrode 1112 are press-fitted into the voids defined in body 1102. That is, the electrodes are in an interference fit engagement with the periphery of the voids. In some implementations, first electrode 1110, and second electrode 1112 are male plugs. In some implementations, first electrode 1110, and second electrode 1112 are female jacks, sockets, or receptacles. In some implementations, one of first electrode 1110, and second electrode 1112 is a female jack and the other is a male plug.

Figure 12A:
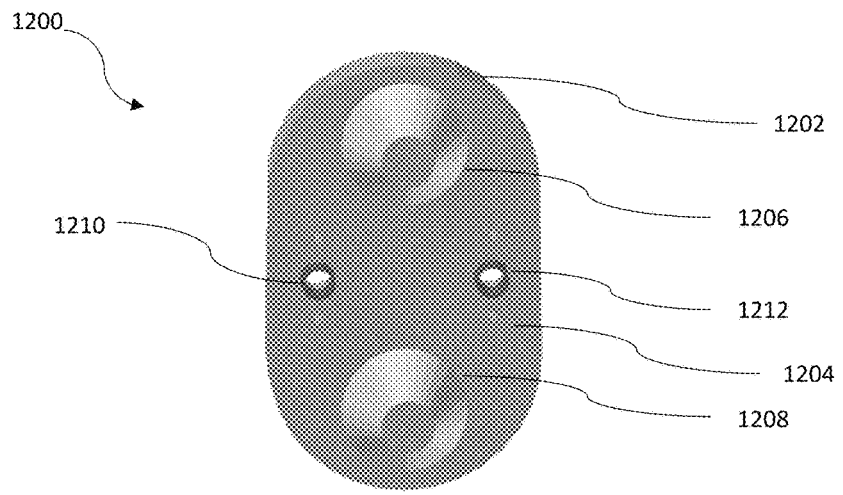
FIG. 12A illustrates, in an axonometric view, a second part of the electrical connector of FIG. 11 in accordance with the present systems, devices, articles, and methods.

FIG. 12A illustrates a second part of the electrical connector corresponding to the first part 1100 of FIG. 11. The second part 1200 of the electrical connector comprises a body 1202, that is receivable, grippable, or graspable by an end-effector of a robotic apparatus. That is, of the size, mass, and characteristics such the end-effector of the robotic apparatus can securely, physically, and releasably engage or hold the second part of the electrical connector 1200. Body 1202 is manipulable by, manipulatable by, and responsive to the actions of, the end-effector of the robotic apparatus. The end-effector of the robotic apparatus may move, and reorient the body 1202.

The second part 1200 of the electrical connector further comprises a face 1204 on the body 1202, and disposed on face 1204 is at least one mechanical element. For example, disposed on and extending from face 1204 is a protrusion or a lug. In some implementations, there is a pair of protrusions. FIG. 12A illustrates a pair of protrusions including a first protrusion 1206 and a second protrusion 1208. The at least one protrusion on face 1204 has a cooperative shape to the at least one depression defined on and in face 1104. That is, the at least one protrusion fits in a sliding engagement with the at least one depression such that face 1104 mates with face 1204. In some implementations, little force is needed to mate face 1104 against face 1204. If the mechanical elements are tapered, that is narrowed, then misalignment of first part of an electrical connector with a second part of an electrical connector can be overcome. The incline planes of the tapers force the parts into a correct alignment.

In some implementations, the first protrusion 1206 and second protrusion 1208 are frustoconical in shape. In some implementations, the shape could be a cone, a pyramid, a frustum of a pyramid, a right circular cylinder, and the like. The shape allows the robotic apparatus to more easily manipulate the second part 1200 of the electrical connector into close fit engagement with the first part 1100 of the electrical connector. In close fit engagement face 1104 is parallel to and mating with face 1204.

Also included in body 1202 is a third void for including a third electrode 1210, and a fourth void for including a fourth electrode 1212. In some implementations, the electrodes (1210 and 1212) are in press-fitted into the voids defined in body 1202. That is, the electrodes are in an interference fit engagement with the periphery of the voids. In some implementations, the third electrode 1210, and the fourth electrode 1212 are jacks. Third electrode 1210, and fourth electrode 1212 are electrically coupled to power source. For example, the second part 1200 of the electrical connector may be electrically connected to a power cord.

The placement of the depression and the corresponding protrusions or lugs may be arbitrary. The protrusions may be included in face 1104 and the depressions in face 1204. In some implementations, a pair of magnets or a magnet and piece of ferrous metal are included in body 1102 and body 1202 such that faces 1104 and 1204 are held in contact when mated. Herein a magnet or a piece of ferrous metal are one component in a magnetic attachment system. A magnetic attachment system provides a magnetic force suitably, approximately, or effectively at a normal to a pair of mating faces.

Figure 12B:
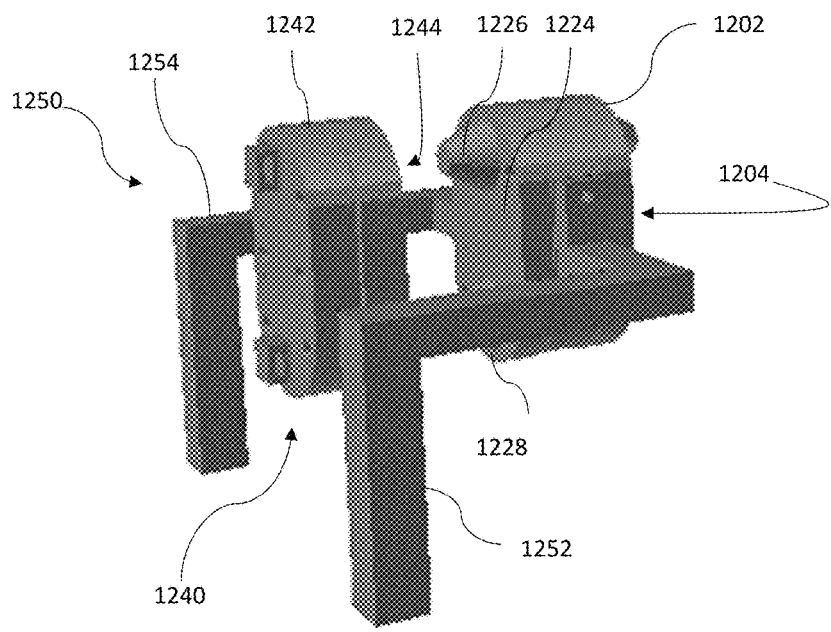
FIG. 12B illustrates, in an axonometric view, the second part of the electrical connector of FIG. 11 along with a docking station, in accordance with the present systems, devices, articles, and methods.

FIG. 12B illustrates a second part of the electrical connector 1250 corresponding to the first part 1100 of FIG. 11 and in alternative to the second part 1200. The view of FIG. 12B is substantially from behind and to the side of the view of FIG. 12A.

The second part of the electrical connector 1250 comprises body 1202, and a first face 1204 on the 1202 (obscured by body 1202 in present angle of view). Body 1202 includes a second face 1224. Second face 1224 can be parallel to the first face 1204 on body 1202. Disposed on second face 1224 is a mechanical element. As illustrated, and extending from, second face 1224 is at least one protrusion. In some implementations, there is a pair of protrusions: protrusion 1226, and protrusion 1228.

The second part of the electrical connector can be stored on a docking station 1240 comprising a body 1242. The body 1242 includes a face 1244. The face 1244 includes mechanical elements to work cooperatively with the mechanical elements on second face 1224. That is there is sliding fit engagement between body 1202 and body 1242. In some implementations, a pair of magnets, or a magnet and piece of ferrous metal are included in body 1202 and body 1242 such that second face 1224 and a corresponding face on body 1242 are held in contact when mated. That is, there is a magnetic force suitably and approximately aligned with the normal to faces that can mate, for example, face 1104 and face 1204, or second face 1224 and face 1244.

In some implementations, the second part of the electrical connector includes one or more handles. A pair of handles (1252, 1254) are illustrated. Using its end-effectors a robotic apparatus can grip or grasp the handles drawing the second part of the electrical connector 1200 from a docking station, or other resting place, and toward the first part of the electrical connector 1100. The handle can be arranged to provide the mechanical affordances needed to allow a robotic apparatus to bring the second part of the electrical connector 1200 into contact and engagement with the first part of the electrical connector 1100. Additionally or alternatively, the handle(s) can include one or more magnets or pieces of ferrous material, and the end-effector includes a complementary magnet or piece of ferrous material to allow the end-effector to magnetically grasp the electrical connector 1200 and/or assist in the end-effector in mechanically grasping the electrical connector 1200.

Figure 13:
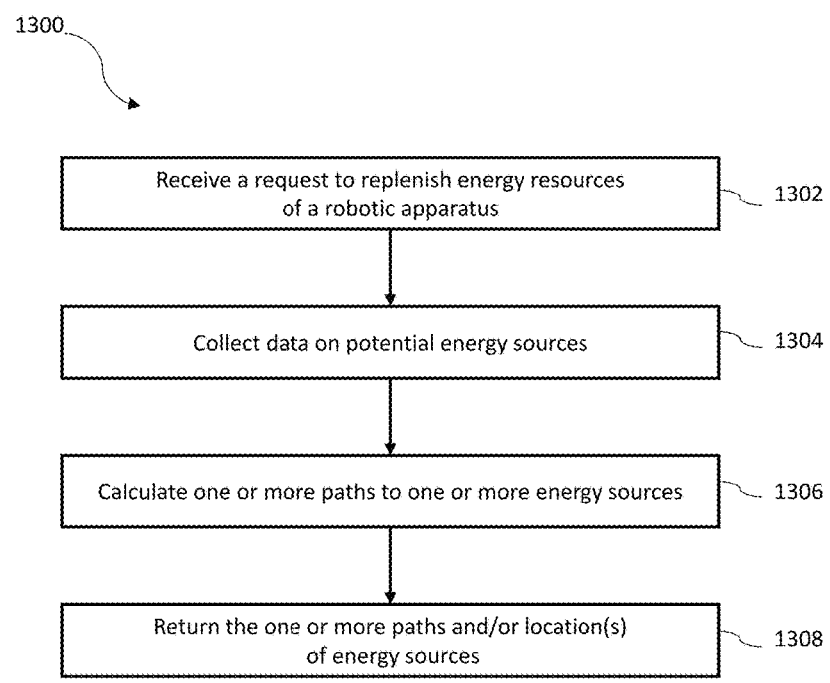
FIG. 13 is a flow-diagram of an implementation of a method of operation of a robotic apparatus to locate an alternative energy source in accordance with the present systems, devices, articles, and methods.

FIG. 13 shows a method of operation in a robotic apparatus to locate an alternative energy source that implements techniques to direct a robotic apparatus to find alternative energy resources. Alternative energy sources include solar energy sources and inductive energy transfer stations. Those of skill in the art will appreciate that variation to the description of preceding methods apply to method 1300.

Method 1300 begins by an invocation by a robot controller. At 1302, the robot controller, receives a request to determine one or more remedies to a deficiency in energy. The robot controller, at 1304, causes the robotic apparatus to collect data on potential energy sources. For example, the robot controller collects data on the robotic apparatus's position and energy resources in the environment. For example, the robotic apparatus determines a location for the robotic apparatus. The robotic apparatus looks for locations that have high likelihood of having energy resources. For example, if an environment includes inductive charging stations the robotic apparatus could search for these. If the robotic apparatus includes solar panels, the robotic apparatus could search for places or locations in the environment with good present sun exposure, evidence of latent heat from sun exposure, shading structures, and the like. One or more energy sources may be present.

At 1306, the robot controller calculates one or more paths from the robotic apparatus's present position to one or more energy sources. In some implementations, the robotic apparatus locates two or more energy sources and/or calculates two or more paths to an energy source. At 1308, the robot controller returns information representing the one or more paths, and/or location(s) of the one or more energy sources. The path(s) and/or location(s) are one or more remedies.

Figure 14:
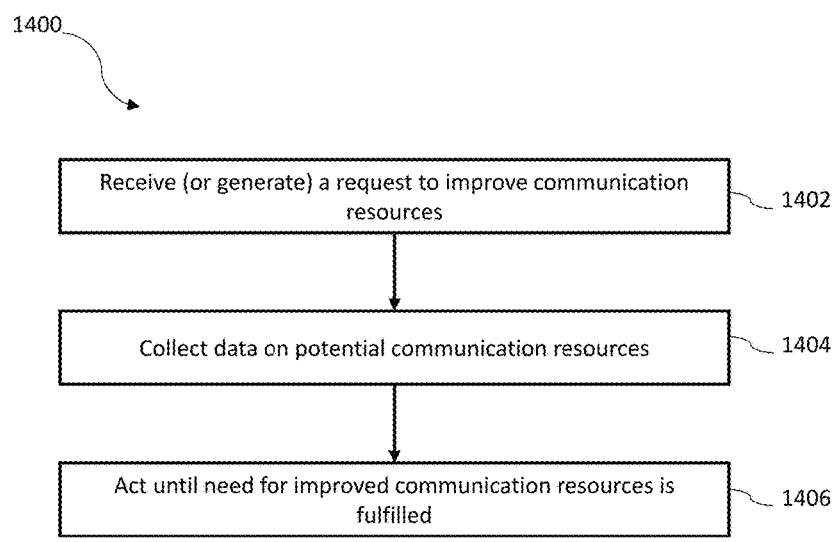
FIG. 14 is a flow-diagram of an implementation of a method of operation of a robotic apparatus to locate communication resources in accordance with the present systems, devices, articles, and methods.

FIG. 14 illustrates a method of operation of a robotic apparatus to locate communication resources. Communication resources include signals for wireless networks and connections to wired networks. Those of skill in the art will appreciate that variation to the description of preceding methods apply to method 1400.

At 1402, the robot controller generates or receives a request to improve (e.g., replenish, renew) communication resources. For example, the request includes information specifying a request to improve the capacity or signal strength (e.g., RSS) of an existing channel, or to find a new communication channel.

At 1404, the robot controller causes the subject robotic apparatus to collect data on available or potential communication resources. For example, the robot controller could discover or locate a tethered (e.g., wire, optical fiber) based communications channel or network. Such can be discovered or located in a similar fashion as used to locate a power supply (method 900, FIG. 9). Alternatively, the robot controller can determine a location or direction of travel that is predicted to improve communications (e.g., increase signal strength). The robot controller can, for example determine a path to a location of additional or alternative communications channels or a location with improved communications (e.g., better signal strength). The robot controller then causes the robotic apparatus to move to seek out wireless communication channels or to move to improve communications.

The robot controller can, for example, employ a map of signal strength throughout an environment to determine a location that will improve communications. The robotic controller can develop and/or update the map as the robotic apparatus moves throughout an environment, for instance performing various other tasks. Also for example, the robot controller can check a map, table, or other data structure that lists various available communications channels, and optionally positions to obtain communications via such communications channels. As yet a further example, the robot controller can cause the robotic apparatus to move in either a defined search pattern (e.g., spiral outward) or a random search pattern to search for improved communications.

At 1406, the robot controller causes the robotic apparatus to act until the need for improved communication resources has been met. For example, the robotic apparatus moves to a better position for WI-FI™ reception. A robotic apparatus could open up parallel communication channels as needed.

Method 1400 combines determining a remedy with implementing (that is, acting on) a remedy. In some implementations, these acts are separated, as taught in at least FIGS. 4, 7, and 8.

Figure 15:
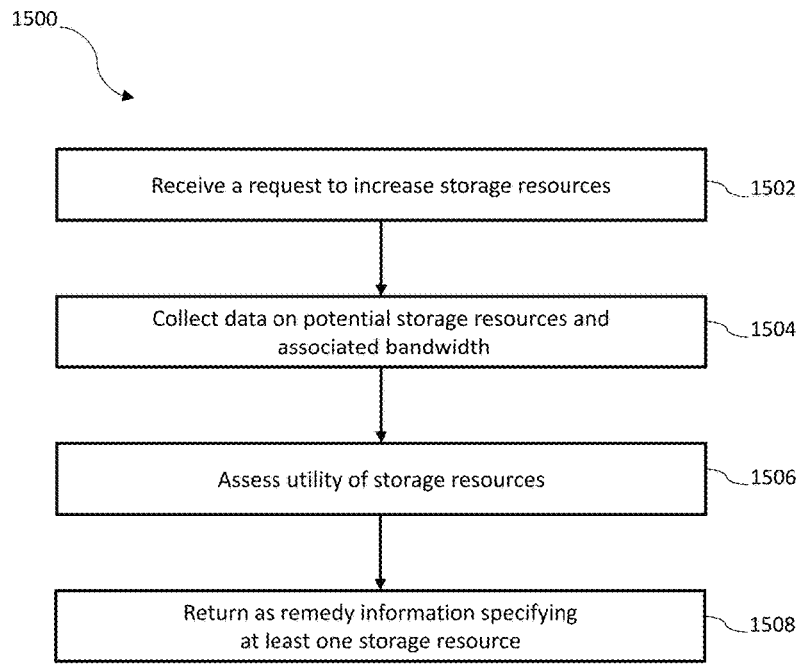
FIG. 15 is a flow-diagram of an implementation of a method of operation of a robotic apparatus to locate storage resources in accordance with the present systems, devices, articles, and methods.

FIG. 15 illustrates a method of operation of a robotic apparatus to locate storage resources (e.g., increase storage resources). Storage resources include remote storage for processor-executable data. Those of skill in the art will appreciate that permissible variation to the description of preceding methods apply to method 1500.

At 1502, the robot controller, receives a request to increase storage resources. In some implementations, information in the request specifies a requirement for data storage capacity. At 1504, the robot controller, collects data on potential storage resources and associated bandwidth available to the subject robotic apparatus. For example, the robotic apparatus seeks storage on a network to augment the storage capacity of an existing storage device. As such, both the bandwidth and storage capacity should be located by the robotic apparatus.

At 1506, the robot controller assesses the utility of these storage resources, e.g., remotely located storage resource. For example, the robot controller assesses both the bandwidth and storage capacity. The robot controller has received the amount of data storage needed, bandwidth, and remote storage capacity. Using latency and elapsed time tolerances, the robot controller may assess the viability of a remote storage device.

At 1508, the robot controller returns information specifying one or more remote storage devices as one or more remedies. For example, the robot controller returns locations for the one or more remote storage devices.

Some implementations include a modified version of the method 1500. Processor capacity replaces storage as a requested computational resource. A robot controller can seek greater processor resources to aid with executing processor-executable instructions that guide a robotic apparatus in executive functions. For example, a robotic apparatus could be presented with a classification tasks that overwhelms the robot controller. Another example, a remote computer can provide additional machine vision processing to aid a robotic apparatus.

Figure 16:
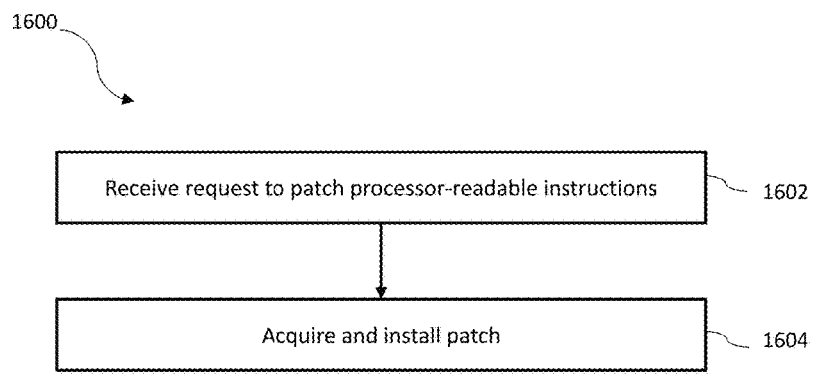
FIG. 16 is a flow-diagram of an implementation of a method operation of a robotic apparatus to install a software patch in accordance with the present systems, devices, articles, and methods.

FIG. 16 illustrates a method 1600 that when executed by a robot controller causes a robot to update processor-executable instructions. Those of skill in the art will appreciate that permissible variation to the description of preceding methods apply to method 1600.

At 1602 a robot controller receives a request to update a set of processor-executable instructions for a subject robotic apparatus. At 1604, the robotic apparatus controller acquires and installs a set of processor-executable instructions.

As discussed herein at least with reference to FIG. 5, a robotic apparatus has a plurality of resources upon which it depends and any one resource can be deficient. The resource deficiencies are ranked by at least two factors. One factor is severity of the resource deficiency. A second factor is pre-defined precedence, ranking, or hierarchy of the resource. For example, a robotic apparatus would value energy as a resource before all other resources. That is, energy is highly ranked. However, if available power is only one percent depleted, then a deficiency of a lesser rank but greater degree would be attended to before energy. Example rankings of resources are energy, safety, computational resources, and enrichment. Thus, a robotic apparatus may address resource deficiencies related to energy and safety before engaging in self-enrichment.

Figure 17:
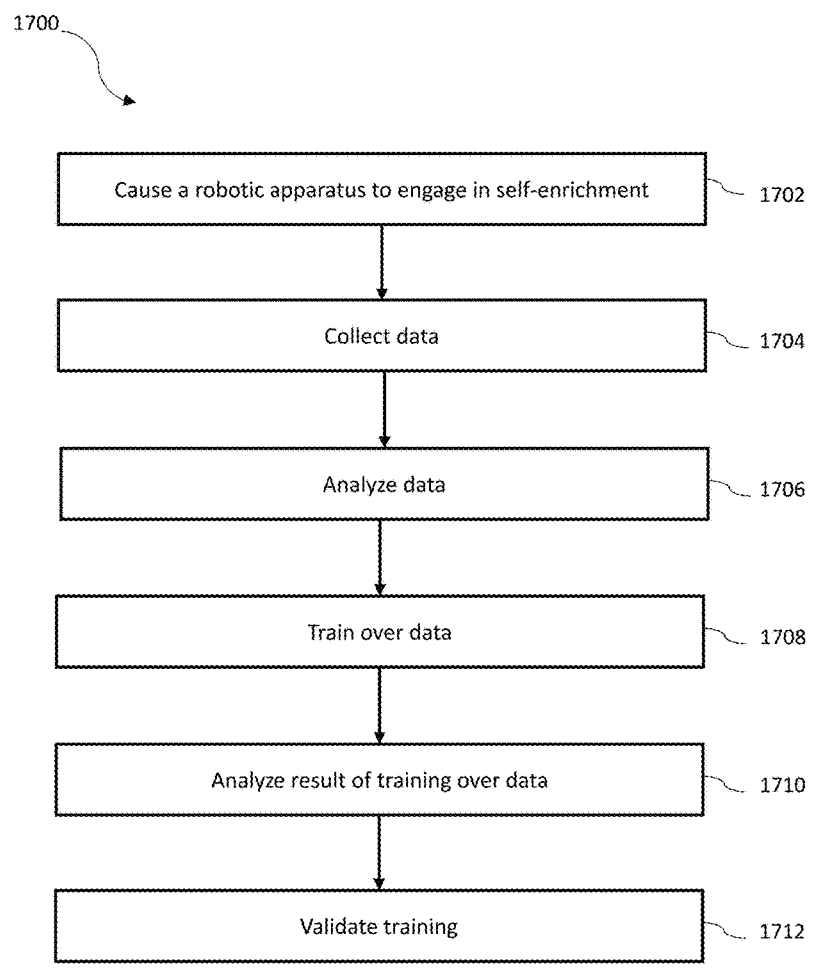
FIG. 17 is a flow-diagram of an implementation of a method of operation of a robotic apparatus to engage in a self-enrichment activity in accordance with the present systems, devices, articles, and methods.

FIG. 17 illustrates a method of operation of a robotic apparatus to engage in a self-enrichment activity. Self-enrichment can come in two forms: one passive and active. In passive self-enrichment, or learning, a robotic apparatus seeks to understand its environment. In active self-enrichment, or novelty seeking, a robotic apparatus seeks novel data for enrichment purposes. Those of skill in the art will appreciate that permissible variation to the description of preceding methods apply to method 1700.

At 1702, the robot controller directs a robotic apparatus to engage in self-enrichment activities. For example, the robotic apparatus has no tasks to do or it is not deficient in any resources deemed more important than enrichment. For example, an operator at an operator station or via a remote control can direct the robotic apparatus to engage in active self-enrichment. Using the robot controller via output subsystem and motion subsystems At act 1704, the robot controller collects data from sensors in or on the subject robotic apparatus, or elsewhere in the environment in which the robotic apparatus operates. For example, when a new object is present in the environment of a robotic apparatus, the robot controller causes the robotic apparatus to acquire data for the new object. For example, where the robotic apparatus is lacking new input in its current environment, the robot controller seeks out new input such as new information or new objects.

At 1706, the robot controller analyzes the data. Analyzing the subject data includes extracting features form the data. For example, the robot controller classifies object in the data. In some implementations, the robot controller analyzes the data associated with a new object in the environment. For example, the robot controller processes the data until an anomaly score lessens to an acceptable level. An anomaly score is a metric that described a degree information characterizing an object does not conform to an expected pattern a dataset.

At 1708 the robot controller extends the analysis over that data by employing learning or training. Learning or training includes supervised and unsupervised learning or training. In supervised learning or training, a human operator, or another agent, can classify a portion of the data of interest to the robotic apparatus. In some implementations, the robot controller exchanges classification information with the operator or another agent.

At 1708, in some implementations, the robot controller engages in reinforcement learning or training where binary feedback on classification by the robot controller is received from another agent. The feedback principally comprises: classification correct, and classification incorrect.

In some implementations, the robot controller engages in unsupervised learning or training. Unsupervised learning or training autonomously finds patterns in data. In some implementations, the unsupervised learning or training is incorporated into act 1708 and act 1710 is omitted.

At 1710 the robot controller analyzes the results of the training or learning and creates a summary data and/or processor-executable instructions. For example, the training or learning could have allowed the robot controller to identify inclement weather. At 1710, the robot controller creates processor-executable instructions to identify such inclement weather without having to store all the data previously collected. In some implementations, the robot controller creates summary data of the training or learning.

At 1712 the robot controller validates training or learning. For example, validates training or learning performed in act 1708. In some implementations, the training or learning was performed previously and/or by a different device from the robotic controller. In validating prior training or learning, the robot controller tests summary data and/or processor-executable instructions.

Method 700 ends until invoked again. Method 700 is applicable to both fully autonomous and piloted robotic apparatus.

Figure 18:
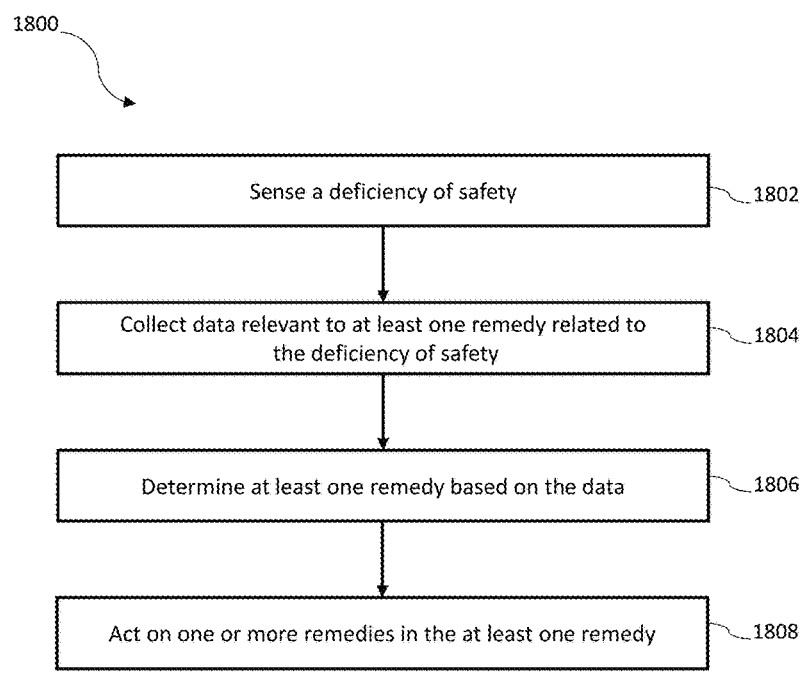
FIG. 18 is a flow-diagram of an implementation of a method of operation of a robotic apparatus to seek safety in accordance with the present systems, devices, articles, and methods.

FIG. 18 illustrates a method of operation of a robotic apparatus to seek safety. For example, shelter is a safety resource that a robotic apparatus may require. For example, rain or other inclement weather may harm a robotic apparatus. Those of skill in the art will appreciate that permissible variation to the description of preceding methods apply to method 1800.

At 1802, the robot controller in conjunction with systems in a subject robotic apparatus detects, determines, or assesses a deficiency of safety. For example, the robot controller receives processor readable data specifying an incoming weather front. The robot controller using the data specifying an incoming weather front and location information may determine safety as a resource will soon disappear.

In some implementations, the robot controller may detect, determine, or assess the failure or degradation of a part. For example, an internal sensor reports information characterizing or specifying wear on a body in the subject robotic apparatus.

At 1804, the robot controller collects data relevant to at least one remedy. For example, locations of shelter and/or spare parts. At 1806, the robot controller assesses or determines at least one remedy based on the data collected in act 1804 and other data. At 1808, the robot controller acts on one or more remedies in the at least one remedy. In some implementations, the robot controller returns the at least one remedy.

Those skilled in the relevant art can readily create source based on the flowcharts of FIGS. 4, 6-10, and 13-18, and the detailed description provided herein.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to robotic apparatus, robotic systems, and robots, not necessarily the exemplary herein robotic apparatus, robotic systems, and robots generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In some embodiments, the present subject matter is implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

Logic or information may be implemented as processor-executable instructions, or processor-readable data, and can be stored on, or in, any memory or storage device for use by or in connection with any processor-related system or method. In the context of this disclosure, a memory is a tangible non-transitory computer-readable storage medium that is an electronic, magnetic, optical, or other physical device that contains or stores processor readable data and/or processor-executable instructions. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable storage medium" and plural form, can be any tangible and non-transitory element that can store processes-executable instruction and/or processor readable data associated with and/or for use by systems, apparatus, device, and/or methods described herein. The computer-readable storage medium can be, for example, but is not limited to, an electronic, magnetic, optical, electromagnetic, infrared, or semiconductor system, apparatus or device. Processor-executable instructions are readable by a processor. More specific examples (a non-exhaustive list) of the computer-readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein can be performed with variations. For example, many of the methods may include additional acts, omit some acts, and/or perform acts in a different order than as illustrated or described.

The various embodiments described above can be combined to provide further embodiments . . . .

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a robotic body;
a sensor subsystem communicatively coupled to the robotic body;
at least one processor communicatively coupled to the sensor subsystem; and
at least one non-transitory computer-readable storage media coupled to the at least one processor, and which stores processor-executable instructions thereon which when executed causes the at least one processor to:
receive, from the sensor subsystem, information regarding a first plurality of resources;
perform an assessment to detect a plurality of resource deficiencies based on the information regarding the first plurality of resources;
in response to detection of the plurality of resource deficiencies in the assessment,
determine the plurality of resource deficiencies associated with a second plurality of resources from amongst the first plurality of resources, wherein the second plurality of resources is fewer than the first plurality of resources,
create, as a result of the determination of the plurality of resource deficiencies, a ranking for the plurality of resource deficiencies,
determine a remedial action for a resource deficiency in the plurality of resource deficiencies, and
cause at least one component of the system to, at least, attempt to execute the remedial action; and
in response to a failure to detect the plurality of resource deficiencies in the assessment,
project future levels for the first plurality of resources based on the information regarding the first plurality of resources, and
compare the future levels for the first plurality of resources to a plurality of thresholds that each correspond to a respective resource deficiency of the plurality of resource deficiencies.

2. The system of claim 1 wherein, when executed, the processor-executable instructions further cause the at least one processor to:
detect one or more actual resource deficiencies.

3. The system of claim 1 wherein, when executed, the processor-executable instructions further cause the at least one processor to:
assess one or more imminent resource deficiencies.

4. The system of claim 1 wherein, to determine a plurality of resource deficiencies associated with a second plurality of resources, the instructions cause the processor to compare levels of the second plurality of resources to corresponding thresholds of the plurality of thresholds.

5. The system of claim 1 wherein, when executed, the processor-executable instructions further cause the at least one processor to:
project the future levels for the first plurality of resources based on information specifying levels of the first plurality of resources.

6. The system of claim 1 wherein, when executed, the processor-executable instructions further cause the at least one processor to:
project the future levels for the first plurality of resources based on a position of the robotic body in a physical space.

7. The system of claim 1 wherein, when executed, the processor-executable instructions further cause the at least one processor to:
determine that the plurality of resource deficiencies exists amongst the second plurality of resources in conjunction with information describing a context of the system.

8. The system of claim 1 wherein, when executed, the processor-executable instructions further cause the at least one processor to:
determine an energy resource deficiency exists in the plurality of resource deficiencies.

9. The system of claim 1 wherein, when executed, processor-executable instructions further cause the at least one processor to:
determine a communication resource deficiency exists in the plurality of resource deficiencies.

10. The system of claim 1 wherein, when executed, the processor-executable instructions further cause the at least one processor to:
determine a computational resource deficiency in the plurality of resource deficiencies.

11. The system of claim 1 wherein, when executed, the processor-executable instructions further cause the at least one processor to:
determine a safety resource deficiency exists in the plurality of resource deficiencies.

12. The system of claim 1 wherein, when executed, the processor-executable instructions further cause the at least one processor to:
determine an enrichment resource deficiency exists in the plurality of resource deficiencies.

13. The system of claim 1 wherein, when executed, the processor-executable instructions further cause the at least one processor to:
create the ranking for the plurality of resource deficiencies based on a predetermined ranking of resources.

14. The system of claim 13 wherein, when executed, the processor-executable instructions further cause the at least one processor to:
create the ranking for the plurality of resource deficiencies based on the plurality of resource deficiencies associated with the second plurality of resources from amongst the first plurality of resources.

15. The system of claim 1 wherein, when executed, the processor-executable instructions further cause the at least one processor to:
return information specifying the plurality of resource deficiencies and information specifying the ranking for the plurality of resource deficiencies.

16. A method of operation of a robotic apparatus, comprising:
receiving, by at least one processor, information regarding a first plurality of resources for the robotic apparatus;
performing an assessment to detect a plurality of resource deficiencies based on the information regarding the first plurality of resources;
in response to detecting a plurality of resource deficiencies in the assessment,
determining, by the at least one processor, a plurality of resource deficiencies associated with a second plurality of resources from amongst the first plurality of resources, wherein the second plurality of resources is fewer than the first plurality of resources;

selecting, by the at least one processor, a resource deficiency from the plurality of resource deficiencies;

determining, by the at least one processor, a remedy to the resource deficiency; and causing, by the at least one processor, the robotic apparatus to implement the remedy to the resource deficiency; and in response to failing to detect the plurality of resource deficiencies in the assessment, projecting, by the at least one processor, future levels for the first plurality of resources for the robotic apparatus based on the information regarding the first plurality of resources for the robotic apparatus, and comparing, by the at least one processor, the future levels for the first plurality of resources for the robotic apparatus to a plurality of thresholds that each correspond to a respective resource deficiency of the plurality of resource deficiencies.

17. The method of claim 16 wherein determining the plurality of resource deficiencies associated with the second plurality of resources from amongst the first plurality of resources, comprises:

detecting, by the at least one processor, one or more actual resource deficiencies.

18. The method of claim 16 wherein determining the plurality of resource deficiencies associated with the second plurality of resources from amongst the first plurality of resources, comprises:

assessing, by the at least one processor, one or more imminent resource deficiencies.

19. The method of claim 16, wherein determining the plurality of resource deficiencies associated with a second plurality of resources includes comparing levels of the second plurality of resources to corresponding thresholds of the plurality of thresholds.

20. The method of claim 16, further comprising:

projecting, by the at least one processor, the future levels for the first plurality of resources for the robotic apparatus based on information specifying levels of the first plurality of resources for the robotic apparatus.

21. The method of claim 16, further comprising:

projecting, by the at least one processor, the future levels for the first plurality of resources for the robotic apparatus based on a position of the robotic apparatus in a physical space.

22. The method of claim 16 wherein determining the plurality of resource deficiencies associated with the second plurality of resources from amongst the first plurality of resources, comprises:

determining, by the at least one processor, that the plurality of resource deficiencies exists amongst the second plurality of resources in conjunction with information describing a context of the robotic apparatus.

23. The method of claim 16 wherein determining the plurality of resource deficiencies associated with the second plurality of resources from amongst the first plurality of resources, comprises:

determining, by the at least one processor, an energy resource deficiency in the plurality of resource deficiencies.

24. The method of claim 16 wherein determining the plurality of resource deficiencies associated with the second plurality of resources from amongst the first plurality of resources, comprises:

determining, by the at least one processor, a communication resource deficiency in the plurality of resource deficiencies.

25. The method of claim 16 wherein determining the plurality of resource deficiencies associated with the second plurality of resources from amongst the first plurality of resources, comprises:

determining, by the at least one processor, a computational resource deficiency in the plurality of resource deficiencies.

26. The method of claim 16 wherein determining the plurality of resource deficiencies associated with the second plurality of resources from amongst the first plurality of resources, comprises:

determining, by the at least one processor, a safety resource deficiency in the plurality of resource deficiencies.

27. The method of claim 16 wherein determining the plurality of resource deficiencies associated with the second plurality of resources from amongst the first plurality of resources, comprises:

determining, by the at least one processor, an enrichment resource deficiency in the plurality of resource deficiencies.

28. The method of claim 16 wherein selecting the resource deficiency from the plurality of resource deficiencies, further comprises:

selecting, by the at least one processor, the resource deficiency from the plurality of resource deficiencies based on a predetermined ranking of resources.

29. The method of claim 28 wherein selecting the resource deficiency from the plurality of resource deficiencies, further comprises:

determining, by the at least one processor, a plurality of degrees of deficiency for the plurality of resource deficiencies associated with the second plurality of resources from amongst the first plurality of resources; and selecting, by the at least one processor, the resource deficiency from the plurality of resource deficiencies based on the plurality of degrees of deficiency for the plurality of resource deficiencies.

30. The method of claim 16 wherein determining the remedy to the resource deficiency, further comprises selecting from the group consisting of:

moving the robotic apparatus in a physical space;
doing nothing; and
sending a distress signal.

31. The system of claim 1, wherein the ranking for the plurality of resource deficiencies is created based on a plurality of factors.

32. The method of claim 16, wherein selecting the resource deficiency from the plurality of resource deficiencies is based on a plurality of factors.

* * * * *